(12) United States Patent
Parnell et al.

(10) Patent No.: US 7,461,998 B1
(45) Date of Patent: Dec. 9, 2008

(54) COASTAL EROSION MITIGATION SOLUTION (CEMS)

(75) Inventors: William C. Parnell, Bradenton, FL (US); Kelly L. Rankin, Key West, FL (US)

(73) Assignee: Beach Restorations, Inc., Galveston, TX (US)

( * ) Notice: Subject to any disclaimer, the term of this patent is extended or adjusted under 35 U.S.C. 154(b) by 549 days.

(21) Appl. No.: 10/835,592

(22) Filed: Apr. 29, 2004

Related U.S. Application Data

(60) Provisional application No. 60/466,336, filed on Apr. 29, 2003.

(51) Int. Cl.
*G01V 3/38* (2006.01)
*E02B 3/04* (2006.01)

(52) U.S. Cl. ............................. 405/21; 405/22; 405/52; 702/5

(58) Field of Classification Search .................. 405/52, 405/21, 22; 702/5, 12
See application file for complete search history.

(56) References Cited

U.S. PATENT DOCUMENTS

| | | | |
|---|---|---|---|
| 5,129,756 A | 7/1992 | Wheeler | 405/23 |
| 5,158,395 A * | 10/1992 | Holmberg | 405/21 |
| 5,536,112 A | 7/1996 | Oertel, II | 405/21 |
| 5,697,736 A * | 12/1997 | Veazey et al. | 405/284 |
| 6,558,075 B2 * | 5/2003 | Benedict et al. | 405/21 |
| 6,931,144 B2 * | 8/2005 | Perrier | 382/100 |
| 2002/0168228 A1 * | 11/2002 | Benedict et al. | 405/21 |
| 2005/0031198 A1 * | 2/2005 | Perrier | 382/157 |

\* cited by examiner

*Primary Examiner*—Tara L. Mayo
(74) *Attorney, Agent, or Firm*—Cooper & Assoc., PC; Mark L. Cooper, Esq.

(57) ABSTRACT

Disclosed herein is a method of stabilizing a beach which includes the steps of producing an engineering design for placement of one or more sand filled, low profile geotextile tubes in proximity to the beach to produce a groin field; and implementing the engineering design to place the one or more sand filled, low profile geotextile tubes in proximity to the beach in accordance with the engineering design to produce the groin field. The method includes an iterative process using multiple model executions to produce an engineering design of a discrete, porous, geotextile groin field for engineering site adaptation and implementation at a specific beach site. The solution may further include post-installation monitoring to assess the effectiveness of the solution and to modify the solution for future erosion mitigation efforts.

14 Claims, 18 Drawing Sheets

CEMS System Description

Historical

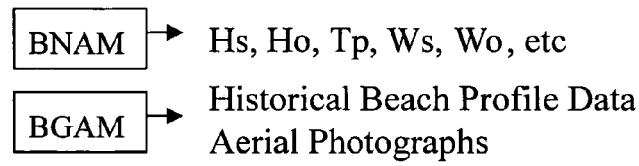

BNAM → Hs, Ho, Tp, Ws, Wo, etc

BGAM → Historical Beach Profile Data
Aerial Photographs

Site Specific

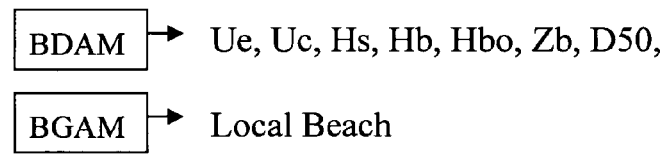

BDAM → Ue, Uc, Hs, Hb, Hbo, Zb, D50,

BGAM → Local Beach

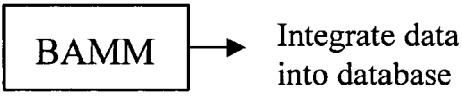

BAMM → Integrate data into database

Operational Display and Analysis

Model expected variance in x-shore
Beach profile shape and elevation
due to seasonal variability and
moderate storms (3 month return
period)

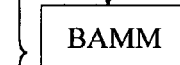

BAMM

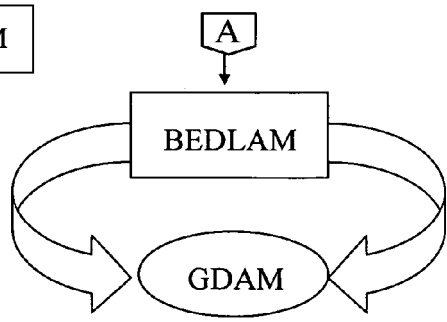

BEDLAM

GDAM

⇩ Final Design Selection

FIG. 7

COASTAL EROSION MITIGATION SOLUTION (CEMS)

This application is a non-provisional utility application which claims benefit of co-pending U.S. Patent Application Ser. No. 60/466,336 filed Apr. 29, 2003, entitled "Coastal Erosion Mitigation Solution (CEMS)" which is hereby incorporated by reference.

BACKGROUND OF THE INVENTION

The present invention relates generally to erosion control devices and methods adapted to prevent or reduce erosion of shoreline and near shore beach sediment or to allow beach sediment to accrete along the shoreline and in the near shore regions. More particularly, this invention pertains to a computer modeling methods used in the design and installation of geotextile groin fields in near shore regions to reduce the erosive effects of sediment transport of alongshore and on shore currents and to promote accretion of sediments in the near shore regions.

The world's system of beaches is a thin band of sand that is an environmental treasure. This system requires protective measures to sustain this valuable resource. The effects of reduced beach sediment input into the beach system will cause erosion and will have a negative impact on the natural process of beach morphology, thus reducing habitat space and protection for upland regions. The United States has approximately 17,000 miles of shoreline. Of this, approximately 10,000 miles are recreational beaches. The sand beaches of the United States are narrow and fragile and any loss or reduction in their characteristics would be catastrophic, both to nature and to the economy.

Most beach erosion can be attributed to the reduction of beach sediment input into the near shore systems due to anthropogenic effects. Sea ports, urbanized estuaries, river navigation and flood control projects, and even projects intended to prevent beach erosion can and do cause erosion. In one typical situation, a pier or jetty is constructed and extends perpendicular from the shoreline into the water. Littoral or near shore currents impinge upon the sides of the pier deflecting the currents away from shore. These currents typically carry sand which would otherwise be deposited near shore between naturally occurring sand bars extending parallel to the shore and the beach. However, since the currents are deflected away from shore, the sand is carried out to deep water, robbing the beach area of sand which would otherwise deposit there.

Furthermore, the deflected currents may wash away protective sandbars. Sandbars are critical to beach protection since they dissipate waves and littoral currents. When sandbars erode, the beachfront and the area of the eroded sandbar is exposed to much stronger currents and waves, causing even more severe beach erosion. Beachfront property owners often spend tens of thousands of dollars each to construct seawalls or revetments on and parallel to the beach in an attempt to stop such erosion. Such attempts, however, serve only to accelerate erosion. Seawalls and revetments only direct the energy of the waves and currents downwardly to the foundation of the seawall or revetment, which scours sand and rock at the foot of the seawall or revetment structure and which ultimately causes the structure to fall into the water. Such downwardly scouring also deepens the water in the area and allows sediment to be carried away from the littoral zone, leading to even more severe erosion.

While the negative effects of the foregoing can be mitigated to some degree, they can't be stopped. However, beach erosion can be retarded and managed. There are currently two basic choices with respect to beach erosion: (1) Allow the beach to erode; or, (2) nourish the beach with sand from a remote source. The former is generally unacceptable and the latter is expensive, but generally necessary. It is estimated that the federal government spends approximately $150,000,000 per year on shore protection and even more on collateral projects that affect beach systems. Individual states and localities spend more that twice that amount. The vast majority of these funds are invested in beach nourishment/re-nourishment projects. Beach nourishment can cost from $1 million to $5 million per mile of beach. Recurring maintenance costs (including re-nourishment) vary from $200,000 to over $1 million per year per mile depending on the re-nourishment cycle, which can vary from 3 to 5 years on average. If the re-nourishment cycle can be extended to 5 to 10 years, significant savings can be obtained.

Near-shore oceanographic studies have identified the complicated and diverse influences of coastal structures on inshore circulation. These influences may alter the character of the flow field including wave action, current speed and direction, turbulent energy levels and mean water levels. Clearly, wave characteristics are the predominant forcing influence on beach characteristics, such as beach profile and sediment grain size. However, man-made structures may influence beach characteristics as much as the natural forcing factors that shape the beach.

Groins fields are sometimes constructed on the beach and near shore region to trap and retain sand, and to nourish the beach compartments between them. Groins initially interrupt the alongshore transport of littoral drift. In conventional applications, they are most effective where alongshore transport is predominantly in one direction, and where their action will not cause unacceptable erosion of the downdrift shore. When a well placed groin field fills to capacity with sand, alongshore transport continues at about the same rate as before the groins were built, and a stable beach is maintained.

One known method of groin field construction involves placing anchored geotextile tubes on anchored mats. The geotubes are positioned one the shore and extend perpendicular to the shoreline into the water. The geotubes are then filled with a cement ballast material pumped into the tube from the shore. Where the currents exceed the erosion velocity, the weighted geotubes are positioned sufficiently far below the surface of the water such that the currents are forced to move upwardly over the geotubes, thereby reducing the velocity of the currents below the erosion velocity. The geotubes are positioned such that the waves associated with the currents do not reflect downwardly toward the bottom to scour the bottom. As the currents and waves rise over the geotubes, they will dissipate and slow down. They do not cause sand or other material to be carried to deeper water or undermine the erosion control structure. Because the currents can be slowed by the structures, sand will actually deposit between a plurality of such geotube structures positioned parallel to one another, ultimately burying the structures and increasing the beach area.

Currently, design and placement of geotube groin fields are based on rules of thumb and trial and error. Only rudimentary measurements of beach and near shore parameters are considered in designing a groin field. Specifically, design and adaptation of conventional geotube groin fields incorporate little in the way of predictive analysis of beach parameters and optimization of groin parameters.

What is needed, then, are numerical model simulations to replicate the beach system and to estimate the effect of varied groin field designs for erosion control.

What is also needed, then, is a method of evaluating multiple model executions of numerical model simulations to produce an engineering design of a discrete, porous, geotextile groin field for engineering site adaptation and implementation at a specific beach site.

SUMMARY OF THE INVENTION

One embodiment of this invention is the CEMS computer aided numerical modeling system, including the CEMS software modules described below, and various databases and computers systems for performing the steps of the methods of the CEMS software modules. The CEMS system includes the integration of the above defined input data set matrices into a series of model excursions, which, when combined with probability analysis, result in a discrete, best fit, high reliability groin field parameters for erosion control and mitigation in both predicted (expected) and boundary (severe storm) conditions. The groin field parameters produced by the CEMS software is then used to design and install a groin field of geotube arrays on the beach as shown in FIG. 3, and described later. Integral to the efficacy of the forgoing array are the dynamics surrounding the geotube shoreline incidence angle, spacing length and cross-sectional height and width, as displayed in FIG. 4.

The general system architecture of the CEMS can be seen in FIG. 6. This system architecture has been translated into a generalized system description, which is displayed in FIG. 7. This description displays the generalized sequence of investigative events and outputs from the system modules. Some tasks required for initializing the several modules may be simultaneous.

One aspect of this method of this invention embodied in the CEMS system is the measurement and analysis of the data from dynamic forces, such as wind and waves, that have a measurable and predictable effect on the erosion potential of the beach envelope being mitigated. In the first instance, measurement of the local beach characteristics and wave and current climate is essential and the essentials for measurement enumerated above provide the vehicles to accomplish this task.

In one step of one embodiment of the method of this invention, the characteristics of the beach that are relatively stable and do not change over relatively short time-scales (order of months to years) are defined and measured and variances are calculated. This data is obtained by location surveys, defining geomorphology (slope, scarp, bottom characteristics, relative grain size, etc.), prior engineering surveys, beach chemistry, beach history, and reconnaissance. In the CEMS embodiment of the method of this invention, BGAM input data is used by the Beach Geomorphology Assessment Module (BGAM) shown in FIG. 8. BGAM to provide measures of variance. The BGAM input data for the BGAM includes: beach slope (in degrees); median grain size (D50/50); beach profile heights from dunes to off shore along multiple profile lines spaced across the beach. The BGAM calculates the change in beach slope (change in height per change in unit time) and performs a spectral analysis to determine and output the variance of the measured inputs. This change in beach slope and variance information provides the morphologic history of the physical beach and identifies historically dynamic regions and historically quiescent regions.

In another step of one embodiment of the method of this invention, the characteristics of the beach that are relatively dynamic (historic and ambient weather and oceanic conditions) are defined and measured. In one step of an alternate embodiment of the method of this invention, correlations to remote monitoring positions are calculated and imputed dynamic characteristics of the beach is calculated as correlated data. In the CEMS embodiment of the method of this invention, BNAM input data is used by the Beach NOAA Analysis Module (BNAM) shown in FIG. 9. to correlate long term data measured at remote locations with the short term data measured directly at the subject beach. The BNAM input data for the BNAM includes: significant wave height (typically average $H_{1/3}$); wave direction and period; and wind speed and direction. In the embodiment shown, NOAA historical data from a NOAA database provides up to 10 years of data from the regional WAVERIDER bouy system. In the CEMs embodiment, this information is used by the Beach NOAA Analysis Module (BNAM) shown in FIG. 9, to calculate empirical correlation coefficients and provides outputs data to the operator as histograms of modal wave height and direction, polar plots for wave height and direction, and polar plots of wind speed and direction. Additionally, the BNAM provides correlated historical data to the numerical analysis software module. provides a predictive assessment of the wind and wave impacts that can affect the beach envelope. In one embodiment, multiple operations of this software module are used to calculate a probability map the wind and wave impacts that can affect the beach envelope.

In another embodiment of the method of this invention, data set matrices from the US Army Corps of Engineers public-domain systems enumerated above are provided as input data for the Beach Corps of Engineers Assessment Module (BCAM) shown in FIG. 10. BCAM uses the data sets derived there from to provide a somewhat macro view of the dynamics surrounding the beach envelope in question and provides a vehicle for multiple excursions, to include introduction of probabilities, to gauge the efficacy of on-site data gathered by the instrumentation platforms. BCAM generates a verification matrix for further use by selected CEMS modules.

In another step of one embodiment of the method of this invention, the characteristics of variances in the vertical profile of horizontal currents at the beach, variation in local turbidity, variations in localized waves heights and periods, variations in turbulent velocities, and variations in local sediment concentrations and sediment flux in the local surf zone calculated from dynamic data obtained from the inshore and offshore instrumentation platforms FIG. 2, ITEMS 28 and 30 and ITEMS 32, 34, 36, 38, 40, and 42. In the CEMS embodiment of the method of this invention, BDAM input data is used by the Beach NOAA Analysis Module (BDAM), shown in FIG. 10, to assess the dynamic relationship and sensitivity between and among input data sets are produced through multiple model runs. The BDAM direct measurement input data (here at least 3 non-linear locations including one location in the near shore region and two locations in the surf zone at high tide) and includes: significant wave height; significant wave direction; horizontal current velocity (measured at 1.5 m above bed for near shore positions, and from 0.4 m above bed to surface for the surf zone position in bins defined to be every 5 cm to 2 m) resolved into velocity east, u, and velocity north, v; alongshore sediment transport mass flux (here measured by sediment traps and time integrated); grain size profile (here measured as % of grain mass in size bins); and beach profile heights (here measured as Latitude, Longitude and Elevation above the geodetic vertical datum) in linear profile from the sand dunes to the zone of no motion for various linear profiles across the beach.

The Beach Instrumentation Platform Data Assessment Module (BDAM) calculates and outputs: wave transformations (change in wave height per unit change in water depth);

incident wave energy; wave energy dissipation along wave path (change of wave energy per unit length traveled) wave-set-up and wave-set-down (measured from average surface elevation at the swash zone and just inshore of the breaker zone respectively); and radiation stresses (both combined stress S and decomposed stresses Syy and Sxx)

In the CEMS embodiment of the method of this invention, once acceptable outputs have been completed and formatted from the foregoing modules, these model-run outputs are used as inputs to numerical model of the Beach Assessment Matrix Manipulator (BAMM) shown in FIG. 11. This module integrates the total impact of all wind and wave vectors and other data effects on the beach envelope and provides a 'table look up capability.' This capability will allow various beach dynamics to be varied to permit model excursions integrating all system impacts. The resultant outputs of the follow-on module are a series of beach profiles that will be inspected to ascertain relative outcomes in follow-on beach profiles. Such outputs are characterized as $P_1, P_2 \ldots P_N$, etc. and are each output maps in the low frequency near shore currents.

The profile outputs of BAMM of FIG. 11 are used as inputs the Groin Design Assessment Module (GDAM) shown in FIG. 12. This module uses beach profile characteristics, sediment characteristics and nearshore characteristics; generates possible groin field designs (expressed as changes in the bathometric profile); executes a stability analysis of these possible groin field designs; and, transmits the candidate groin field designs to the Beach Engineering Design Longshore Assessment Module (BEDLAM) FIG. 13. The GDAM uses linear algebraic methods to calculate equation (28) below and determine R (a length parameter related to the height of the submerged groin) in an iterative process to the point that near shore current speed is reduced such that sediment will not be in motions. The generated possible groin field designs include groin field parameters of groin length, width, height, weight, spacing and aspect angle to the shore.

In the CEMS embodiment of the method of this invention, the BEDLAM module shown in FIG. 13, is the capstone computational module of the CEMS system. It accepts the candidate groin field parameters from GDAM FIG. 12 and reruns these candidate parameters in the BAMM module using predetermined sever storm wave and wind parameters (boundary conditions) to determine post-storm effects. The post-storm bathometric profile with the candidate groin field parameters is again rerun in the BAMM module to evaluate the post-storm recovery effects. Each candidate design is then evaluated to determine an optimal groin field parameters. This final groin field parameters are output with respect to mean high tide 66, mean low tide 68, and include groin length 70, groin spacing 72, groin aspect angle to shore and cross-section (geotextile width 74 and geotextile tube height 76) as illustrated in FIG. 3.

BRIEF DESCRIPTION OF THE DRAWINGS

FIG. 7 is a block diagram depicting s the CEMS system description.

DESCRIPTION OF THE PREFERRED EMBODIMENTS

Figure 1:
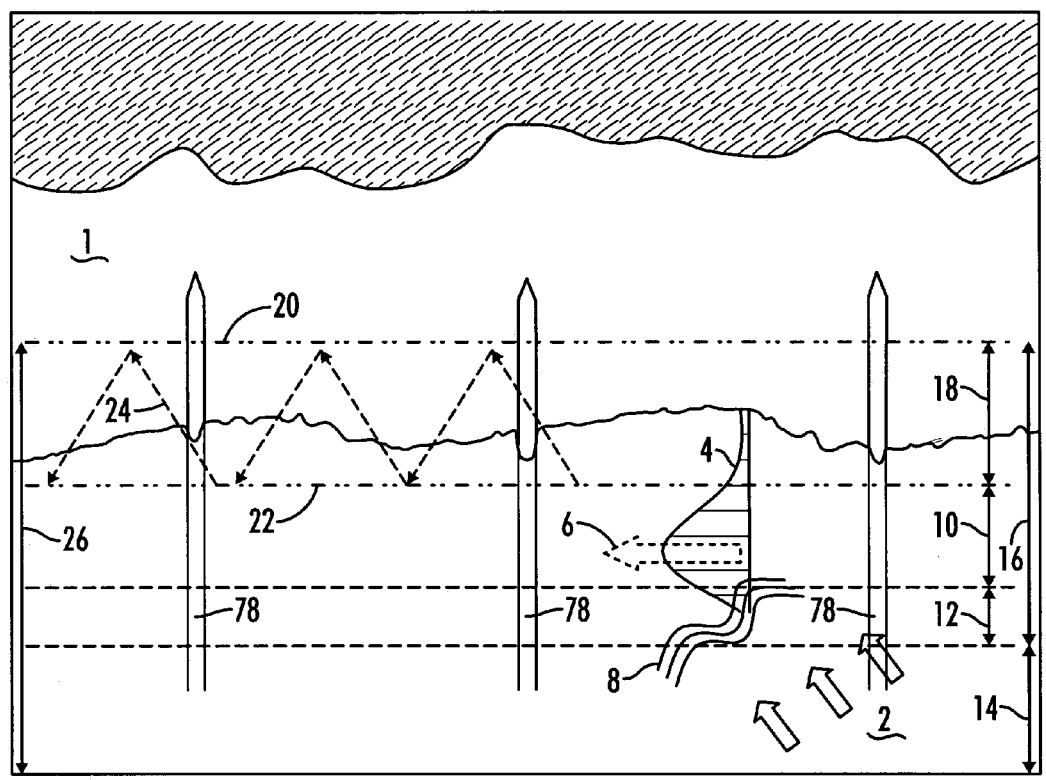
FIG. 1 is an overhead view of the beach envelope with a geotube groin field installed.

Definitions of Relevant Terms for Drawings and Reference

ITEM 1. Beach—a shoreline region including areas having sedimentary materials such as sand and gravel deposited and washed by tides and waves.

ITEM 2. Incident Waves—surface gravity waves entering the near-shore beach zone.

ITEM 4. Alongshore-Current profile—a collection of measurements of current velocity and direction at specified depths for a shore parallel current created by incident waves.

ITEM 6. Surf Zone Sediment Transport—sediment motion cause by alongshore current.

ITEM 8. Region of Wave Breaking—the region at which the water depth is approximately 80% of the wave height.

ITEM 10. Surf Zone—inshore region of breaking waves.

ITEM 12. Breaker Zone—the offshore boundary of the surf zone.

ITEM 14. Offshore—seaward of the breaker zone.

ITEM 16. Inshore—landward of and including the breaker zone.

ITEM 18. Swash Zone—region of beach bounded by the extent of wave run up and rundown.

ITEM 20. Extent-of-Wave Run-up—region of beach periodically wetted by incident waves.

ITEM 22. Extent-of-Wave Run-down—region of beach periodically sub aerial.

ITEM 24. Sediment Transport in the Swash Zone—superpositioned cross-shore and alongshore sediment transport due to wave run up and rundown.

ITEM 26. Near-shore Zone—entire beach extending offshore to region of no sediment transport. This defines the littoral zone.

ITEM 28. In-shore Instrumentation Platform.

ITEM 30. Offshore Instrumentation Platform.

ITEM 32. Electronic Distance Meter (EDM)—device for measurement of distance.

ITEM 34. Acoustic Doppler Current Profiler (ADCP)—device for measurement of two or three dimensional currents throughout the water column.

ITEM 36. Optical Backscatter Sensor (OBS)—device for measurement of total suspended solids in the water column.

ITEM 38. Paros-Digiquartz Pressure Sensor (PDPS)—a piezoelectric device for measurement of wave height tide stage.

ITEM 40. Acoustic Doppler Velocimeter (ADV)—device for high frequency, single-point measurement of three-dimensional current velocity.

ITEM 42. Laser In-Situ Sediment Transmissionmeter (LISST)—a laser transmissionmeter device for measurement of sediment concentration and grain size distribution at a single point in the water column.

ITEM 44. STWAVE, Steady State Irregular Wave Model, US Army Corps of Engineers, quantifies change in wave parameters (wave height, wave period, wave direction) between offshore, where the wave field is fairly homogeneous on the scale of miles; and, nearshore, where waves are strongly influenced by variations in bathymetry, water level and current.

ITEM 46. SBEACH, Storm Induced Beach Change Model, US Army Corps of Engineers, Simulates two-dimensional cross-shore beach change with emphasis on beach and dune erosion and bar formation and movement due to storms. It is used to predict beach profile change on short time scales (on the order of hours to days).

ITEM 48. GENESIS, Generalized Model for Simulating Shoreline Change, US Army Corps of Engineers, simulates long term (on the order of months to years) shoreline change produced by spatial and temporal changes in alongshore sand transport. This model can accept various configurations of coastal structures, such as groins, as input parameters.

ITEM 50. NMLONG, Numerical Model for Simulating Longshore Current, calculates the expected alongshore current by solving the wave energy flux conservation equation (alongshore component of radiation stress).

ITEM 52. BGAM, a module of the CEMS system to capture and integrate geomorphology, beach profile surveys (slope, scarp, dunes, sediment characteristics) and other baseline data.

ITEM 54. BNAM, a module of the CEMS system to capture and integrate NOAA data (wind speed, wind direction, wave height, wave period, wave direction and barometric pressure) displaying external impacts on the beach profile.

ITEM 56. BDAM, a module of the CEMS system to capture and integrate local data (alongshore/cross-shore current speed, wave height, wave transformation, tidal effects, bottom shear stress, sediment suspension concentration, reference sediment concentration, breaking wave height and breaking wave angle) displaying local impacts on the beach profile.

ITEM 58. BAMM, a module of the CEMS system to integrate and array data in matrix form for use in subsequent computational modules. The array data is stored in the CEMS system data base.

ITEM 60. BPAM, a computational module of the CEMS system to develop a cross-shore beach profile displaying expected variances in the beach profile due to seasonal meteorology and moderate storms.

ITEM 62. GDAM, a computational module of the CEMS system to determine and assess groin design. This module assesses groin profile, groin length, groin width, submerged weight of groin, groin spacing, groin armor layer, groin anchoring, anti-scour mat underlayment and construction logistics.

ITEM 64. BEDLAM, a computational module of the CEMS system, incorporating initial groin field design obtained from GDAM into the alongshore beach profile in order to select the best groin field design for engineering site adaptation and implementation.

ITEM 66. Mean high tide.

ITEM 68. Mean low tide.

ITEM 70. Geotube length.

ITEM 72. Geotube spacing.

ITEM 74. Geotube width.

ITEM 76. Geotube height.

ITEM 78. Geotube groin.

Understanding, parameterizing, measuring, calculating and predicting the effects of the natural factors (items 1-26 above and as shown in FIG. 1) that influence near-shore processes and beach characteristics in general, and understanding parameterizing, measuring, calculating and predicting the effects of incident waves 2 in particular constitutes a novel method of computer aided numerical analysis producing geotube groin field parameters for the design and installation of a geotube groin field in a beach system. One embodiment of the present invention is the effective Coastal Erosion Mitigation Solution (CEMS) software modules and methods of determining: the number of geotube groins required; the groin spacing the groin length, height and width; groin weight; and groin aspect angle with the shorelint.

As incident waves 2 approach the shoreline and enter the region of wave breaking 8, their forward propagation speed is reduced in proportion to the water depth due to bottom friction. Since the direction of incident waves 2 on the shoreline is almost never perpendicular to the shoreline, the wave refracts (the shoreward wave segment slows more than the seaward wave segment). In the surf zone 10, the alongshore variation in mean water level and incident wave height combine to produce forces that generate an alongshore current 4 flowing away from high waves and water level. Given the wave and beach characteristics, and the angle from which incident waves are approaching, it is possible to predict the magnitude of the alongshore current 4 and the capacity of this current for carrying suspended sediments 6, and, to utilize this wave refraction effect to mitigate erosion by manipulating the alongshore current 4.

As a wave approaches the shoreline from offshore 14 into the breaker zone 12 into the inshore region 16, the velocity of the wave crest increases while the speed of propagation of the wave decreases. At some point, the velocity of the crest overtakes the wave trough and the wave breaks 8 on the shoreline. Experimental analyses indicate that the wave tends to break when the depth of the water becomes less than approximately 1.3 times the wave height, or the slope of the wave crest exceeds 1:7. The foregoing tends to hold true for any shoreline environment. The run-up 20 and run-down 22 from the water mass transported onto the beach from breaking waves creates a swash zone 18, and it is in this zone that the maximum sediment transfer 24 tends to occur.

Understanding the wave and beach characteristics will allow for the prediction of the magnitude of along-shore current 4, wave run-up 20 and run-down 22. The resulting suspended sediment load may next be calculated with the knowledge of the near-bed flow velocities and turbulence, and the direction of sediment transport 24 may be predicted with knowledge of the incident wave 2 direction and beach slope.

Ultimately, parameterizing, measuring, calculating and predicting the patterns of near-shore 26 circulation and resultant sediment transport becomes the basis of the CEMS software design and method. We are especially interested in understanding parameterizing, measuring, calculating and predicting the swash zone 18 dynamics, as this is the region where most sediment transport 24 occurs, and provides for the greatest opportunity to encourage the deposition of sediment and to produce beach stabilization. Entrained sediment moves up the beach face and retreats down the beach face in the backwash area. The interaction of these movements (since wave action is almost never perpendicular to the beach axis) results in current velocity vectors that can be manipulated by groin design to reduce the current velocity and dissipate incident wave energy in a manner that deposition of littoral drift and reduces erosion of sedimentary deposits. The two components of sediment transport along the beach—in the surf zone 10 and in the swash zone 18—provide the mechanism for sediment movement, and, thus greatly affect the method of groin design.

One difference between one embodiment of this invention, the Coastal Erosion Mitigation Solution (CEMS) software and method, and other geotextile and engineered groin processes is the novel method of computer aided numerical analysis producing geotube groin field parameters for the design and installation of a geotube groin field in a beach system. This method of this invention parameterizes, measures, calculates and predicts the effects of specific beach, wind, wave, sediment, and other significant characteristics and calculates input data set matrices. The method of this invention then uses the input data set matrices to calculate various sets of groin field parameters, evaluate each set of groin field parameters based on predicted and boundary condition beach dynamics based on probabilities of occurrence of these beach dynamics. An optimal set of groin field parameters is then selected for further design and installation.

The method of this includes parameterization, measurement (direct or historical or imputed by correlation), numerical modeling and dynamic probability determination of the some of following beach characteristics:

(a) beach gradient geomorphology parameterization (height along a cross-sectional length);
(b) wave characteristics parameterization (height, speed of propagation, period, direction);
(c) water elevation, including wave set-up, set-down, tide and storm surge variations parameterization (height, period, direction);
(d) wind characteristics parameterization (speed and direction);
(e) wave transformation parameterization (cross-shore and long-shore radiation stress);
(f) cross-shore and long-shore current parameterization;
(g) wave run-up and wave run-down parameterization;
(h) wave and wind setup parameterization;
(i) grain size parameterization across the beach profile
(j) temporal and spatial beach profile parameterization;
(k) bottom topography to seaward parameterization;
(l) cross-shore sediment transport characteristics parameterization;
(m) alongshore sediment transport characteristics parameterization; and
(n) storm erosion parameterization.

It will be recognized by one skilled in the art that alternate parameters may be selected to model the desired effects, that equivalent alternate software or other modeling methods may be employed, and that some of the above-identified characteristics may be omitted from various embodiment of the present invention.

Figure 2:
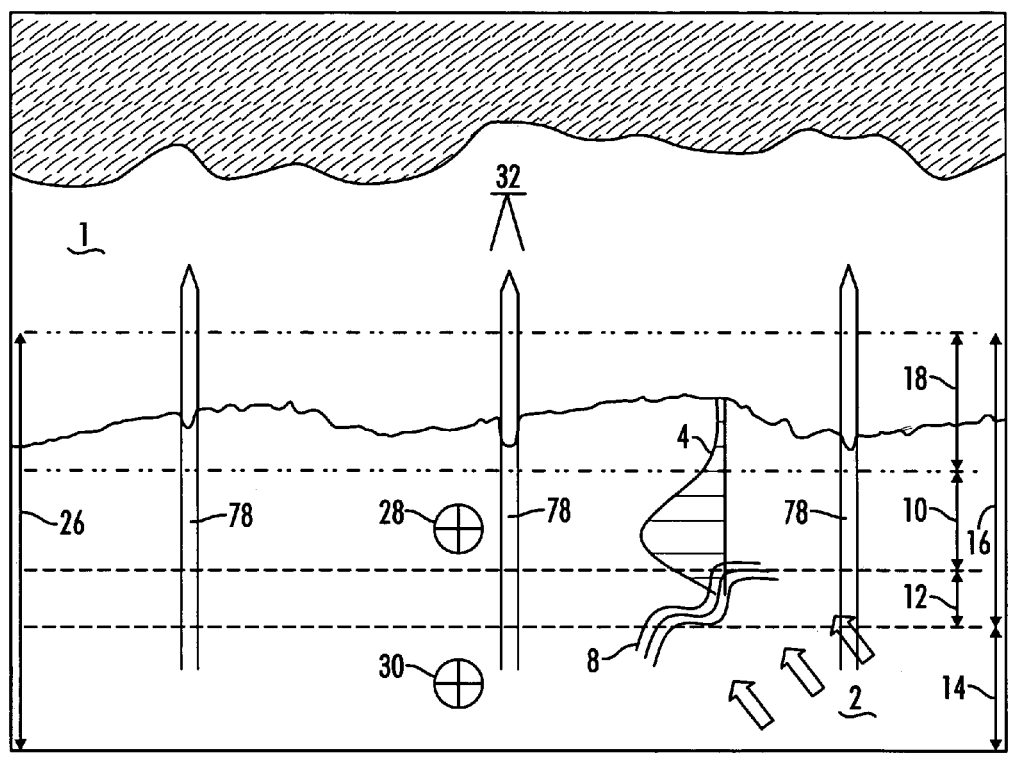
FIG. 2 is an overhead view of the beach envelope of FIG. 1 further depicting the notional location of the instrumentation platforms.

In one embodiment of this invention, the measurement data information is generated, in part, by inshore 16 and offshore 14 instrumentation platforms shown in FIG. 2. These platforms will be deployed in at least 20 feet of water inshore identified by numeral 28 and offshore 30 of the site. Included on these platforms are:

(a) at least one Acoustic Doppler Current Profiler (ADCP) for measurement of the vertical profile of horizontal currents 34;
(b) at least one Optical Backscatter Sensor (OBS) to measure local turbidity 36; and
(c) at least one piezo-electric pressure sensor, here a Paros-Digiquartz Pressure Sensor (PDPS) for the measurement of wave height and period 38.

In another embodiment of this invention, additional instrumentation platforms are secured in the surf zone 10 at low tide (the platforms will be immediately offshore 14 of the surf zone 10 at high tide). Included on these platforms are:

(a) at least one Acoustic Doppler Current Profiler (ADCP) for measurement of the vertical profile of horizontal currents 34;
(b) at least one Optical Backscatter Sensor (OBS) to measure local turbidity 36;
(c) at least one piezo-electric pressure sensor, here a Paros-Digiquartz Pressure Sensor (PDPS) for the measurement of wave height and period 38;
(d) at least one Acoustic Doppler Velocimeter (ADV) for the measurement of turbulent velocities 40; and
(e) at least one Laser In-Situ Sediment Transmissiometer (LISST) for the measurement of local sediment concentration of the estimate of sediment flux in the surf zone 42.

In yet another embodiment of this invention, high-resolution beach profiles (a minimum of 70 meter along-shore spacing along the beach in question) are measured with an Electronic Distance Meter (EDM) 32.

Figure 5:
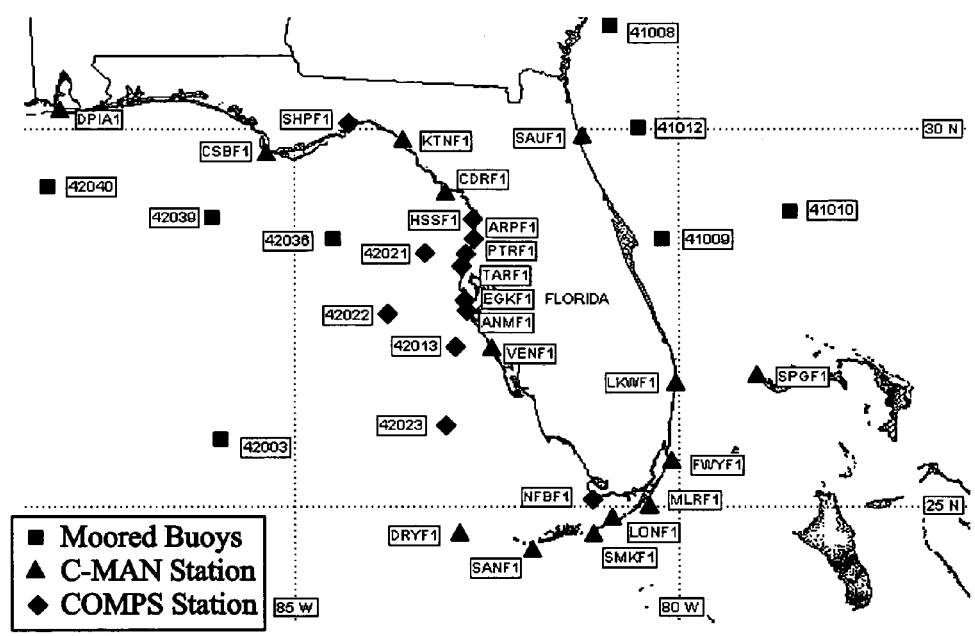
FIG. 5 is a chart of NOAA Buoy, C-MAN Station and COMP Station locations in the eastern Gulf of Mexico and the Atlantic Coast of Florida as an example of NOAA worldwide oceanographic data sources.

In yet another embodiment of this invention, these data are integrated with information and historical data from the National Oceanic and Atmospheric Administration (NOAA) US National Backbone for Marine Observations (example shown in FIG. 5). These NOAA assets provide historic and ambient wind speed, direction, and gust; barometric pressure; air temperature; sea surface temperature; and wave heights and periods. The results of this integration is an input data set matrix that will be used in conjunction with other input data set matrices to drive the stochastic and deterministic computer models—the CEMS models—for solution design.

Additionally, in one embodiment of this invention, public domain US Army Corps of Engineers beach system assessment software models are used to develop and define additional input data set matrices. These models are:

(a) STeady State Irregular WAVE Model (STWAVE) 44 for providing beach wave excursions;
(b) Storm-induced BEAch Change Model (SBEACH) 46 for providing cross-shore and longshore beach profile excursions for storm analysis (5 to 15 year return periods);
(c) GENEralized Model for SImulating Shoreline Change (GENESIS) 48 also for providing cross-shore and longshore beach profile excursions for storm analysis (5 to 15 year return periods); and (d) Numerical Model for simulating the LONGshore Current (NMLONG) for providing longshore current profiles and sediment flux excursions 50.

Figure 3:
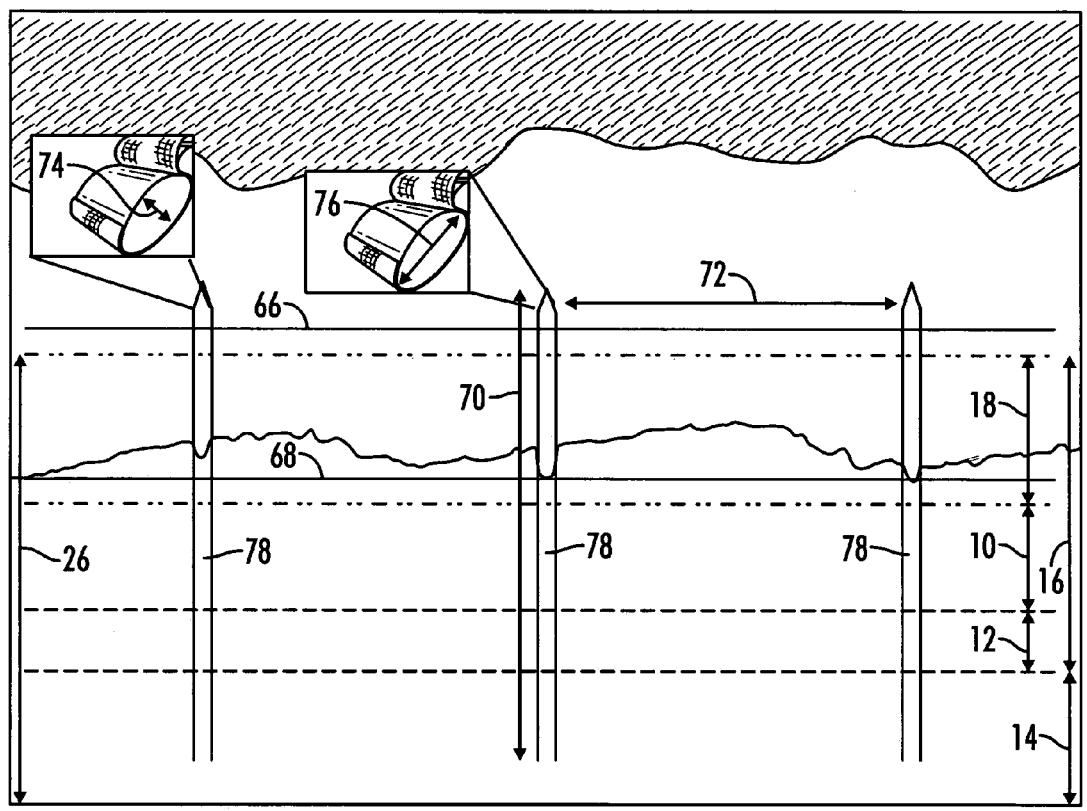
FIG. 3 is an overhead view of the beach envelope of FIG. 1 further depicting the notional location of the geotube groins and showing details of groin cross sectional dimensions.
Figure 4:
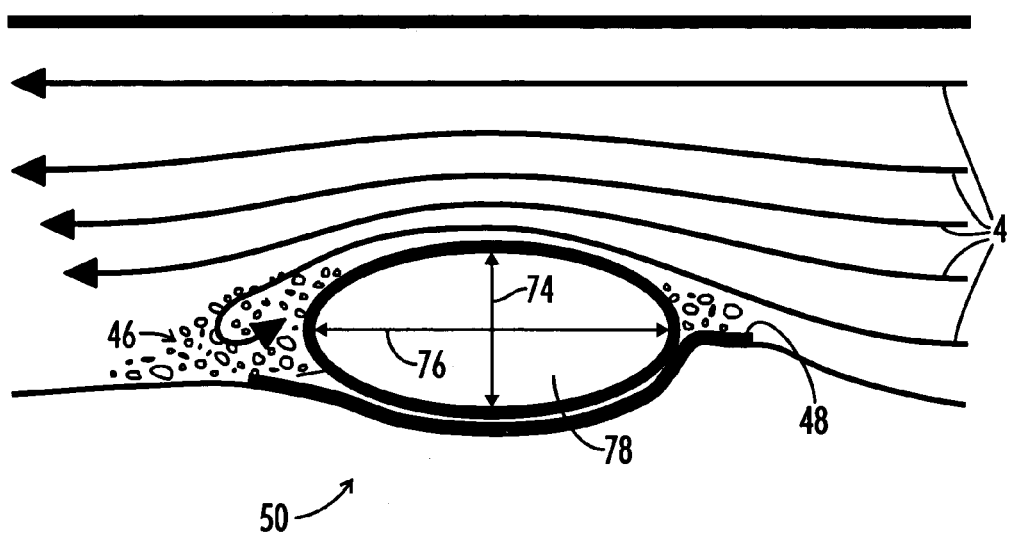
FIG. 4 is a cross-sectional view of a geotube groin showing sediment deposition zones.

One embodiment of this invention is the CEMS computer aided numerical modeling system, including the CEMS software modules described below, and various databases and computers systems for performing the steps of the methods of the CEMS software modules. The CEMS system includes the integration of the above defined input data set matrices into a series of model excursions, which, when combined with probability analysis, result in a discrete, best fit, high reliability groin field parameters for erosion control and mitigation in both predicted (expected) and boundary (severe storm) conditions. The groin field parameters produced by the CEMS software is then used to design and install a groin field of geotube arrays on the beach as shown in FIG. 3, and described later. Integral to the efficacy of the forgoing array are the dynamics surrounding the geotube shoreline incidence angle, spacing length and cross-sectional height and width, as displayed in FIG. 4.

Figure 6:
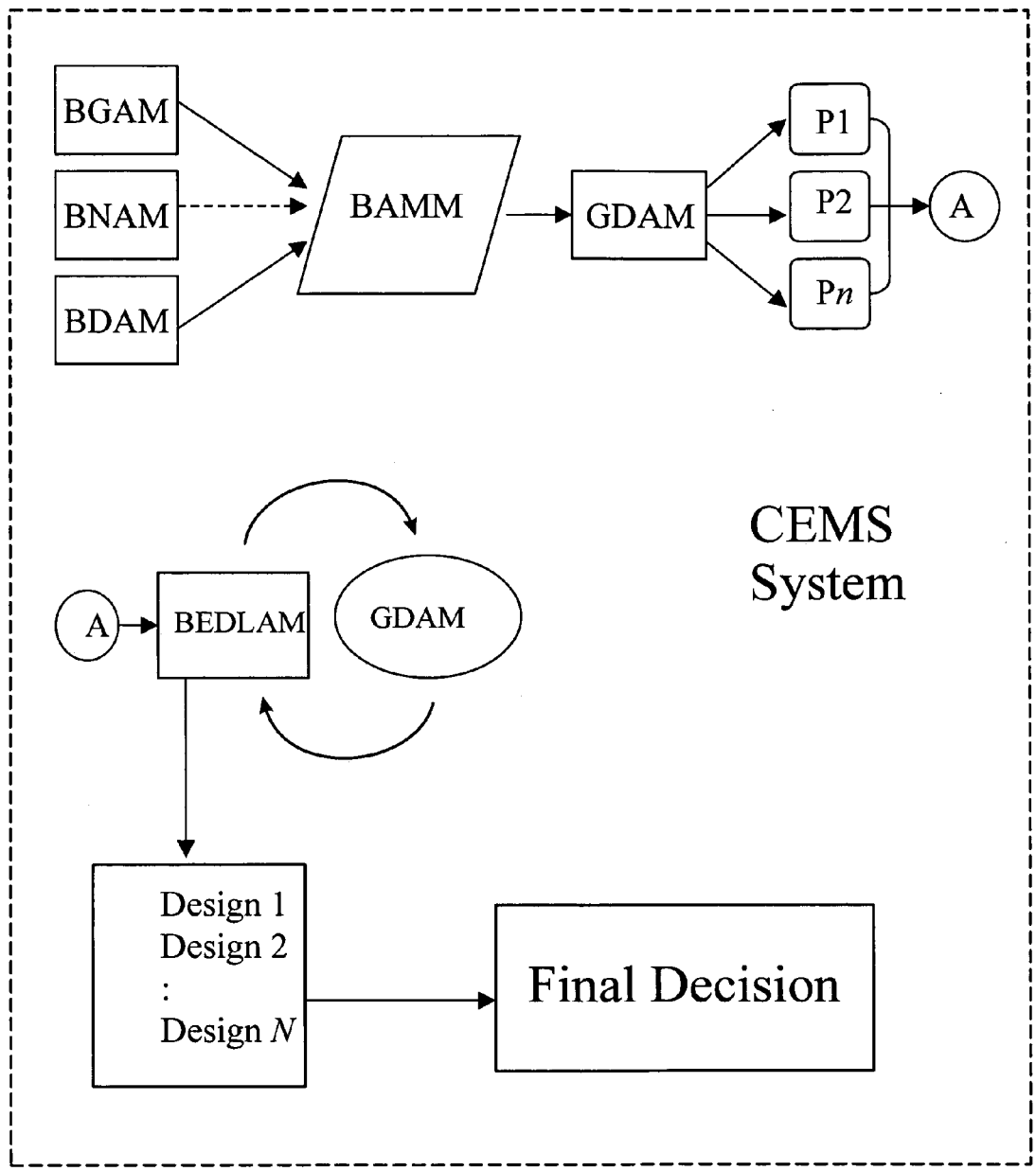
FIG. 6 is a block diagram depicting the CEMS system architecture.

The general system architecture of the CEMS can be seen in FIG. 6. This system architecture has been translated into a generalized system description, which is displayed in FIG. 7. This description displays the generalized sequence of investigative events and outputs from the system modules. Some tasks required for initializing the several modules may be simultaneous.

One aspect of this method of this invention embodied in the CEMS system is the measurement and analysis of the data from dynamic forces, such as wind and waves, that have a measurable and predictable effect on the erosion potential of the beach envelope being mitigated. In the first instance, measurement of the local beach characteristics and wave and current climate is essential and the essentials for measurement enumerated above provide the vehicles to accomplish this task.

Figure 8:
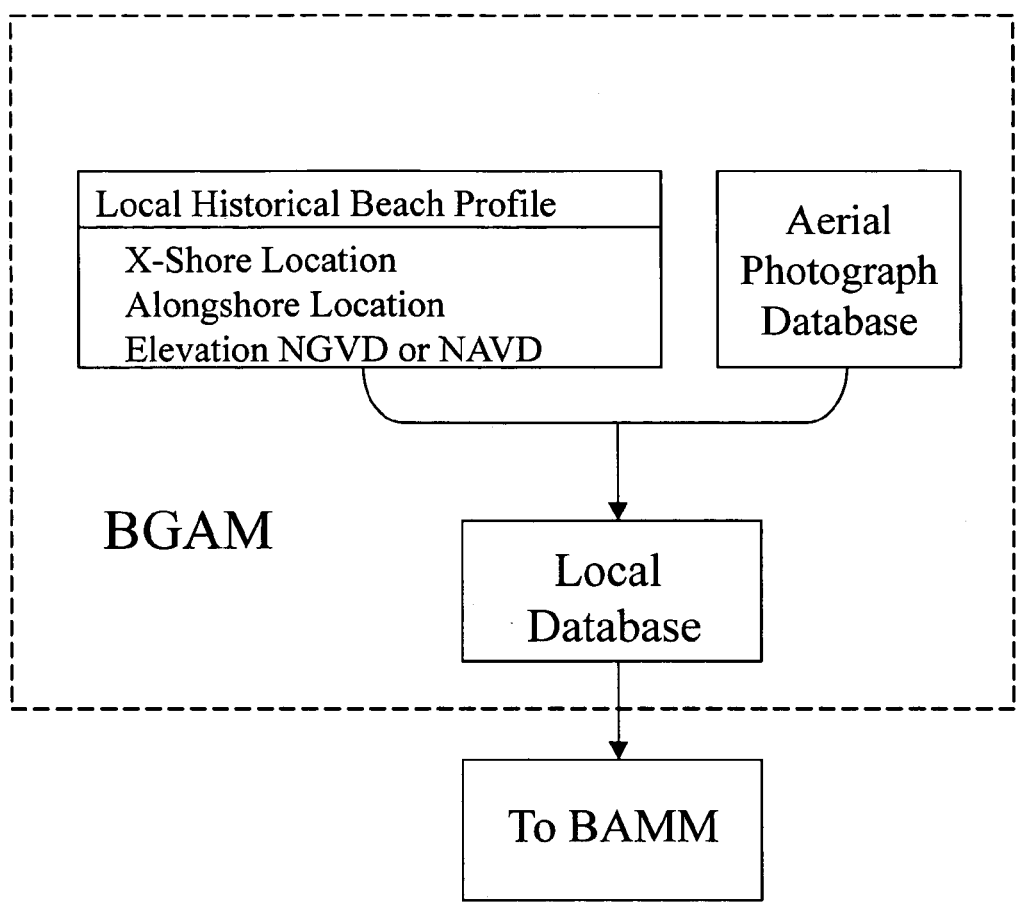
FIG. 8 is a block diagram depicting the Beach Geomorphology Assessment Module (BGAM) of CEMS.

In one step of one embodiment of the method of this invention, the characteristics of the beach that are relatively stable and do not change over relatively short time-scales (order of months to years) are defined and measured and variances are calculated. This data is obtained by location surveys, defining geomorphology (slope, scarp, bottom characteristics, relative grain size, etc.), prior engineering surveys, beach chemistry, beach history, and reconnaissance. In the CEMS embodiment of the method of this invention, BGAM input data is used by the Beach Geomorphology Assessment Module (BGAM) shown in FIG. 8. BGAM to provide measures of variance. The BGAM input data for the BGAM includes: beach slope (in degrees); median grain size (D50/50); beach profile heights from dunes to off shore along multiple profile lines spaced across the beach. The BGAM calculates the change in beach slope (change in height per change in unit time) and performs a spectral analysis to determine and output the variance of the measured inputs. This change in beach slope and variance information provides the morphologic history of the physical beach and identifies historically dynamic regions and historically quiescent regions.

Figure 9:
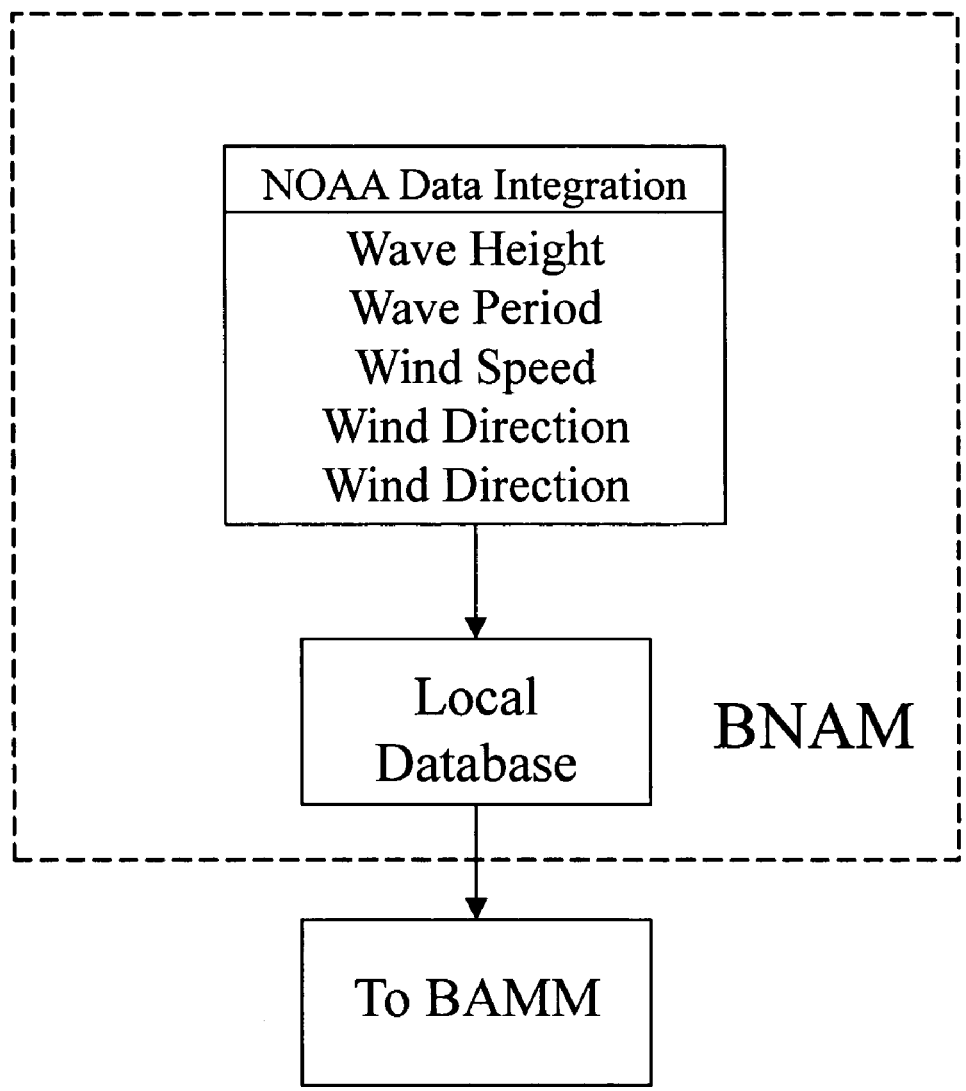
FIG. 9 is a block diagram depicting the Beach NOAA Analysis Module (BNAM) of CEMS.

In another step of one embodiment of the method of this invention, the characteristics of the beach that are relatively dynamic (historic and ambient weather and oceanic conditions) are defined and measured. In one step of an alternate embodiment of the method of this invention, correlations to remote monitoring positions are calculated and imputed dynamic characteristics of the beach is calculated as correlated data. In the CEMS embodiment of the method of this invention, BNAM input data is used by the Beach NOAA Analysis Module (BNAM) shown in FIG. 9. to correlate long term data measured at remote locations with the short term data measured directly at the subject beach. The BNAM input data for the BNAM includes: significant wave height (typically average $H_{1/3}$); wave direction and period; and wind speed and direction. In the embodiment shown, NOAA historical data from a NOAA database provides up to 10 years of data from the regional WAVERIDER bouy system. In the CEMs embodiment, this information is used by the Beach NOAA Analysis Module (BNAM) shown in FIG. 9, to calculate empirical correlation coefficients and provides outputs data to the operator as histograms of modal wave height and direction, polar plots for wave height and direction, and polar plots of wind speed and direction. Additionally, the BNAM provides correlated historical data to the numerical analysis software module, provides a predictive assessment of the wind and wave impacts that can affect the beach envelope. In one embodiment, multiple operations of this software module are used to calculate a probability map the wind and wave impacts that can affect the beach envelope.

Figure 10:
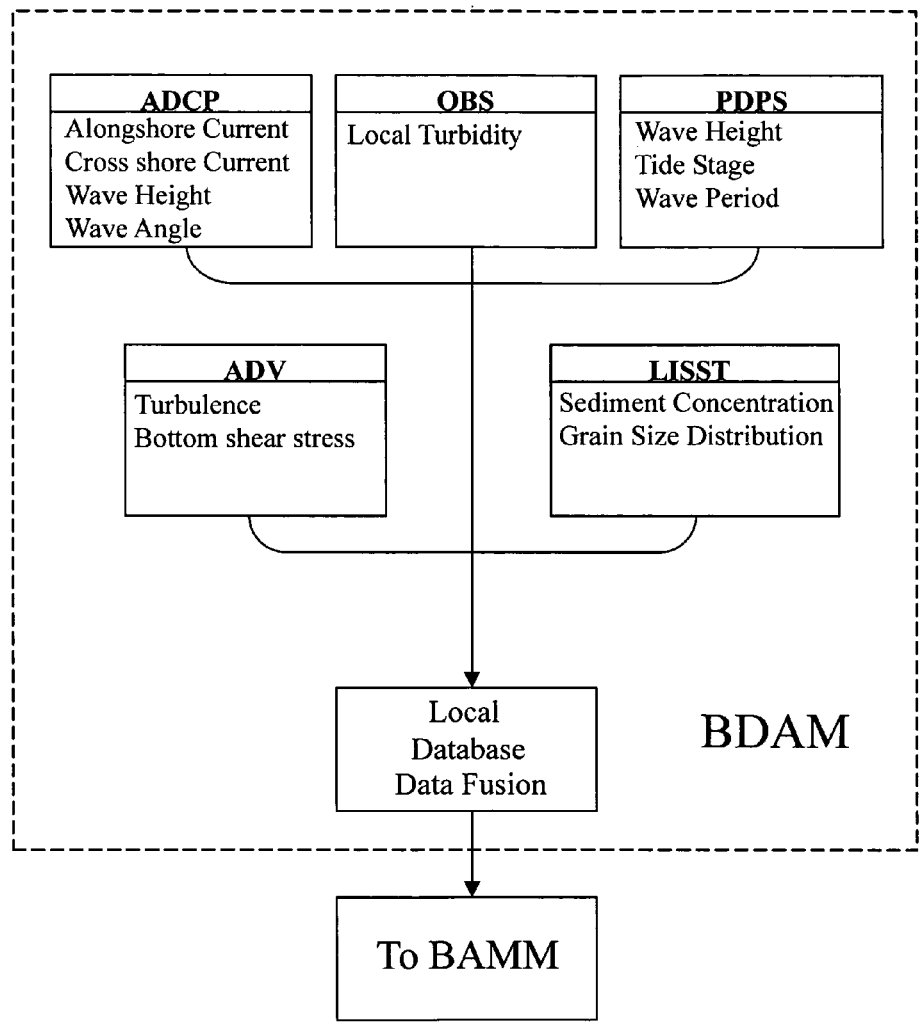
FIG. 10 is a block diagram depicting the Beach Instrumentation Platform Data Assessment Module (BDAM) of CEMS.

In another embodiment of the method of this invention, data set matrices from the US Army Corps of Engineers public-domain systems enumerated above are provided as input data for the Beach Corps of Engineers Assessment Module (BCAM) shown in FIG. 10. BCAM uses the data sets derived there from to provide a somewhat macro view of the dynamics surrounding the beach envelope in question and provides a vehicle for multiple excursions, to include introduction of probabilities, to gauge the efficacy of on-site data gathered by the instrumentation platforms. BCAM generates a verification matrix for further use by selected CEMS modules.

In another step of one embodiment of the method of this invention, the characteristics of variances in the vertical profile of horizontal currents at the beach, variation in local turbidity, variations in localized waves heights and periods, variations in turbulent velocities, and variations in local sediment concentrations and sediment flux in the local surf zone calculated from dynamic data obtained from the inshore and offshore instrumentation platforms FIG. 2, ITEMS 28 and 30 and ITEMS 32, 34, 36, 38, 40, and 42. In the CEMS embodiment of the method of this invention, BDAM input data is used by the Beach NOAA Analysis Module (BDAM), shown in FIG. 10, to assess the dynamic relationship and sensitivity between and among input data sets are produced through multiple model runs. The BDAM direct measurement input data (here at least 3 non-linear locations including one location in the near shore region and two locations in the surf zone at high tide) and includes: significant wave height; significant wave direction; horizontal current velocity (measured at 1.5 m above bed for near shore positions, and from 0.4 m above bed to surface for the surf zone position in bins defined to be every 5 cm to 2 m) resolved into velocity east, u, and velocity north, v; alongshore sediment transport mass flux (here measured by sediment traps and time integrated); grain size profile (here measured as % of grain mass in size bins); and beach profile heights (here measured as Latitude, Longitude and Elevation above the geodetic vertical datum) in linear profile from the sand dunes to the zone of no motion for various linear profiles across the beach.

The Beach Instrumentation Platform Data Assessment Module (BDAM) calculates and outputs: wave transformations (change in wave height per unit change in water depth); incident wave energy; wave energy dissipation along wave path (change of wave energy per unit length traveled) wave-set-up and wave-set-down (measured from average surface elevation at the swash zone and just inshore of the breaker zone respectively); and radiation stresses (both combined stress S and decomposed stresses Syy and Sxx)

Without being bound by theory, it is thought that wave-set-up and wave-set-down create a pressure differential (radiation stress S) that generates a low frequency current (modulated with the period of wave sets). It is further thought that this current is a critical contributor to sediment entrainment where the current exceeds the sediment carrying velocity. Where S is decomposed, it can be seen that Syy generates the alongshore current and Sxx generates the set-up and set-down current.

A novel aspect of the method of this invention is that the geotube groin field parameters, in particular groin height, width, length and aspect angle, can be calculated by iterative numerical analysis such that the along shore current is intercepted and groin height is sufficient to reduce the current below the sediment carrying velocity. Optimally, the aspect angle is perpendicular to the radiation stress S vector and, thus, the near shore current.

Figure 11:
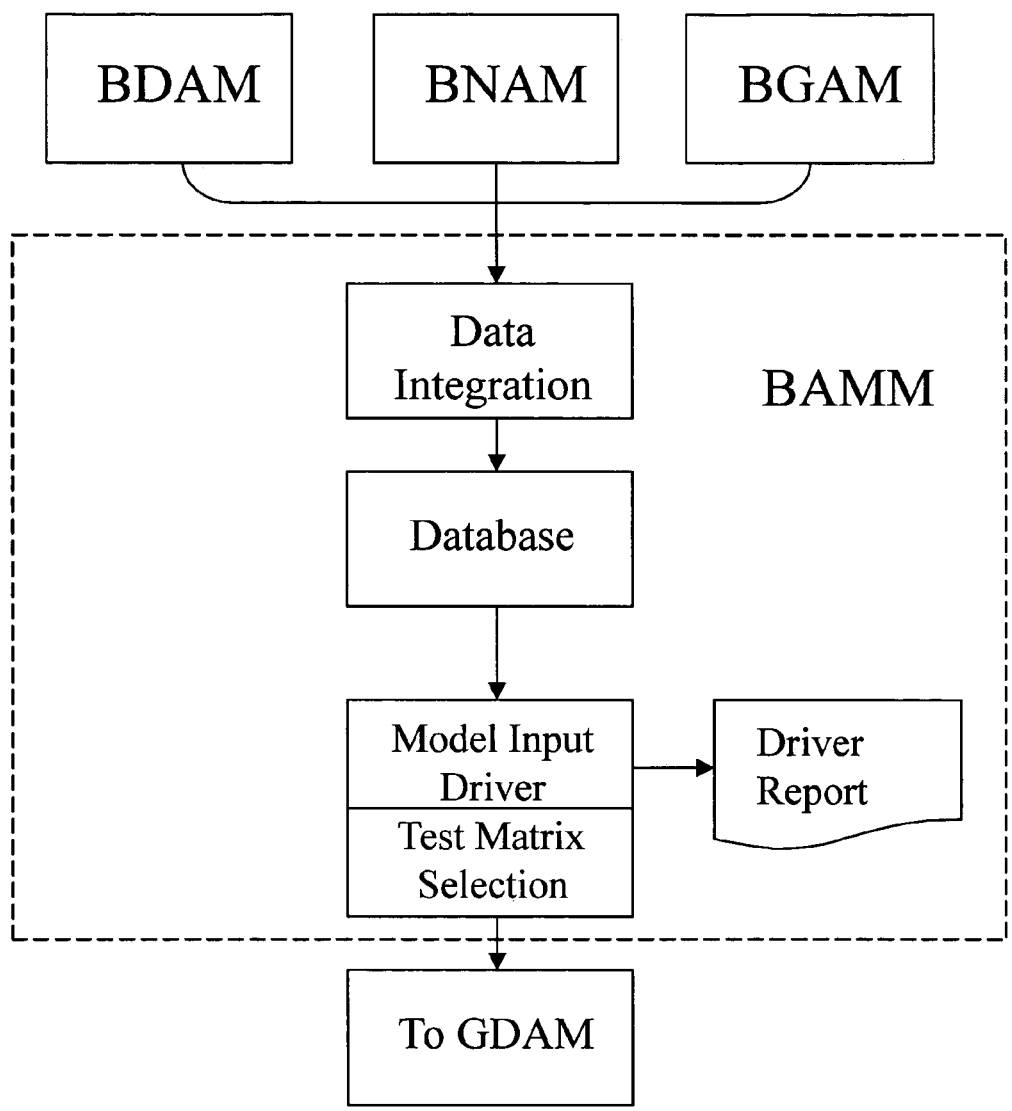
FIG. 11 is a block diagram depicting the Beach Assessment Matrix Manipulator (BAMM) Module of CEMS.

In the CEMS embodiment of the method of this invention, once acceptable outputs have been completed and formatted from the foregoing modules, these model-run outputs are used as inputs to numerical model of the Beach Assessment Matrix Manipulator (BAMM) shown in FIG. 11. This module integrates the total impact of all wind and wave vectors and other data effects on the beach envelope and provides a 'table look up capability.' This capability will allow various beach dynamics to be varied to permit model excursions integrating all system impacts. The resultant outputs of the follow-on module are a series of beach profiles that will be inspected to ascertain relative outcomes in follow-on beach profiles. Such outputs are characterized as $P_1, P_2 \ldots P_N$, etc. and are each output maps in the low frequency near shore currents.

Figure 12:
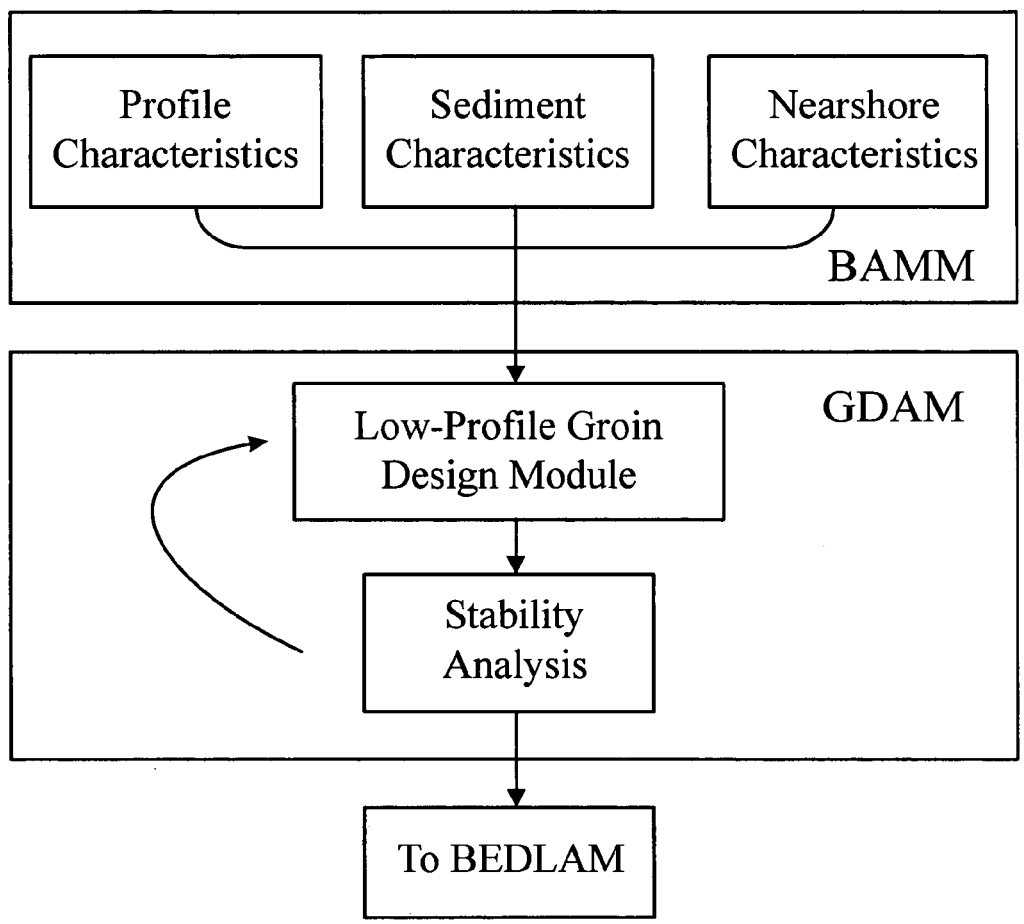
FIG. 12 is a block diagram depicting the Groin Design Assessment Module (GDAM) of CEMS.

The profile outputs of BAMM of FIG. 11 are used as inputs the Groin Design Assessment Module (GDAM) shown in FIG. 12. This module uses beach profile characteristics, sediment characteristics and nearshore characteristics; generates possible groin field designs (expressed as changes in the bathometric profile); executes a stability analysis of these possible groin field designs; and, transmits the candidate groin field designs to the Beach Engineering Design Longshore Assessment Module (BEDLAM) FIG. 13. The GDAM uses linear algebraic methods to calculate equation (28) below and determine R (a length parameter related to the height of the submerged groin) in an iterative process to the point that near shore current speed is reduced such that sediment will not be in motions. The generated possible groin field designs include groin field parameters of groin length, width, height, weight, spacing and aspect angle to the shore.

Figure 13:
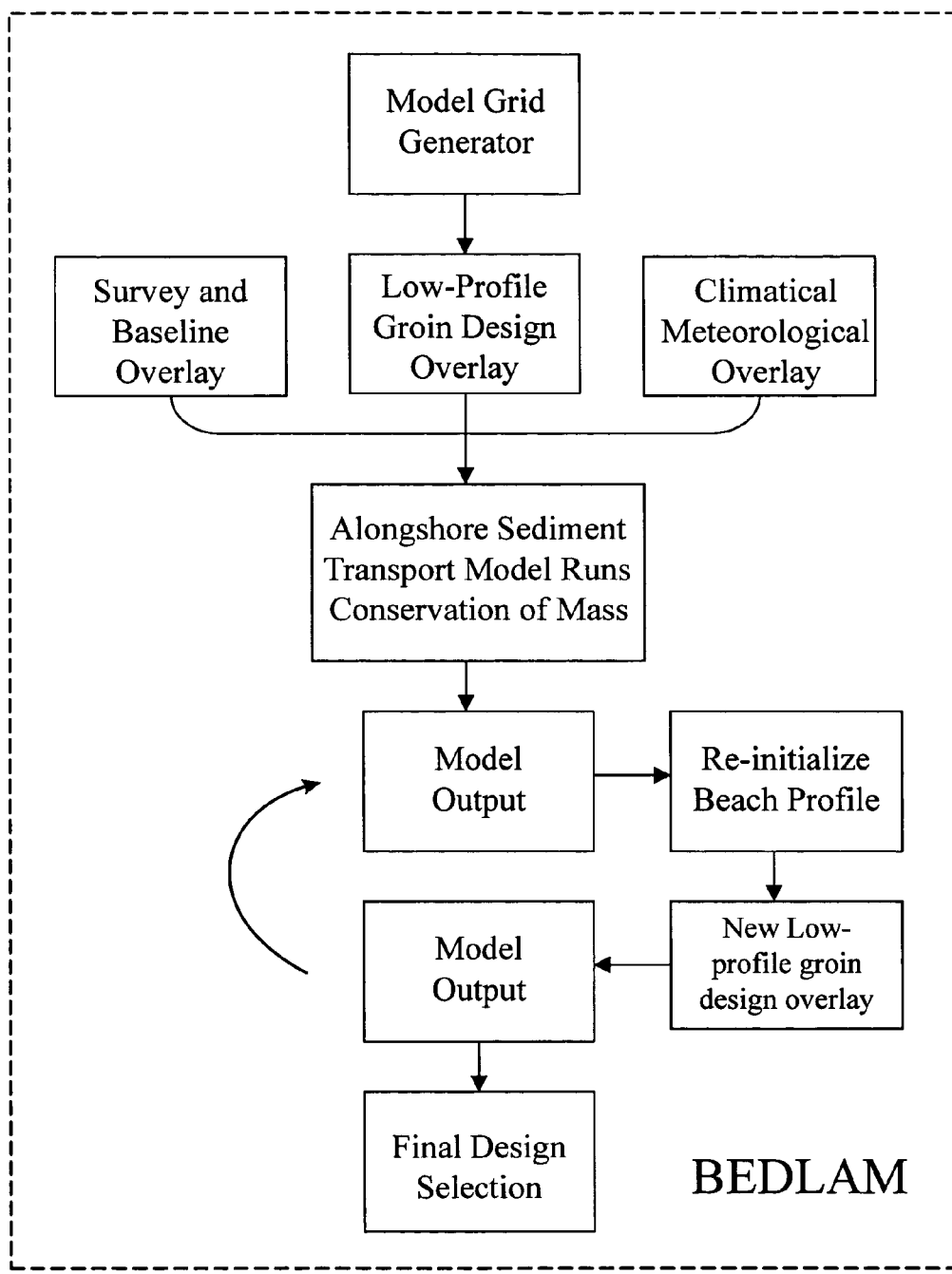
FIG. 13 is a block diagram depicting the Beach Engineering Design Longshore Assessment Module (BEDLAM) of CEMS.

In the CEMS embodiment of the method of this invention, the BEDLAM module shown in FIG. 13, is the capstone computational module of the CEMS system. It accepts the candidate groin field parameters from GDAM FIG. 12 and reruns these candidate parameters in the BAMM module using predetermined sever storm wave and wind parameters (boundary conditions) to determine post-storm effects. The post-storm bathometric profile with the candidate groin field parameters is again rerun in the BAMM module to evaluate the post-storm recovery effects. Each candidate design is then evaluated to determine an optimal groin field parameters. This final groin field parameters are output with respect to mean high tide 66, mean low tide 68, and include groin length 70, groin spacing 72, groin aspect angle to shore and cross-section (geotextile width 74 and geotextile tube height 76) as illustrated in FIG. 3.

Calculation of Alongshore Sediment Transport Rate from CERC Equation

The following is an example of software module calculations of the necessary information for the placement of geotubes to protect a beach at Port Charlotte, Fla.; illustrating the method of the present invention as used to solve a beach restoration problem for a specific application. One skilled in the art will recognize that several equations may be used repetitively and by different software modules.

The alongshore sediment transport rate, Q, is calculated using the CERC equation, which estimates Q as a function of the alongshore component of the wave energy flux in the surf zone $$Q = \frac{KH_b^{5/2}\sqrt{g/\gamma}\sin(2\theta)}{16(s-1)(1-a)} \quad (1)$$

where K is a proportionality constant (0.77), γ is the breaking wave criterion (0.78), s is the specific gravity of quartz sand (2.65), and a is the sediment porosity (0.3).

Breaking wave height, $H_b$, is calculated using the equation $$H_b = \frac{H_0}{3.3\left(\frac{H_0}{L_0}\right)^{1/3}} \quad (2)$$

Figure 14:
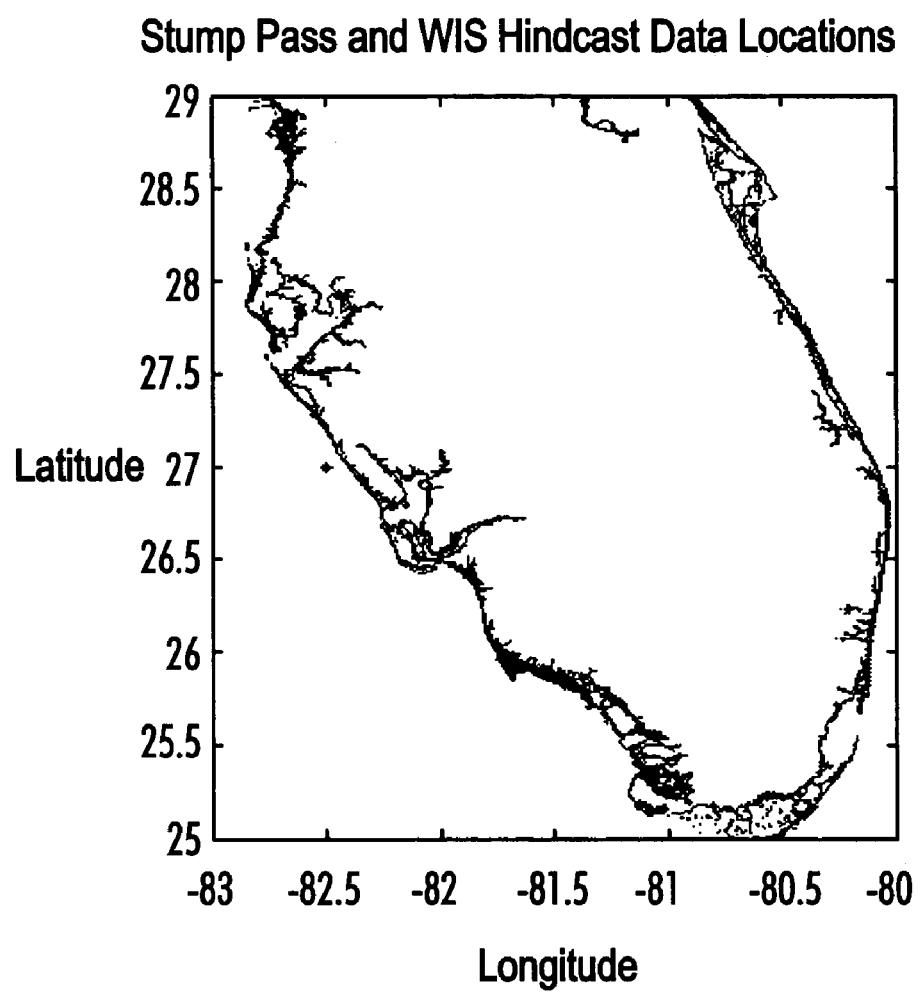
FIG. 14 is a chart showing exemplar locations in the eastern Gulf of Mexico and the Atlantic Coast.

WIS Hindcast Data from Station GU1019 over the years 1976-1995 is used to calculate the breaking wave height. WIS Hindcast Data are generated from numerical models (WIS-WAVE, WAM) driven by climatological wind fields overlaid on grids containing estimated bathymetries. The WIS numerical hindcasts supply long-term wave climate information at nearshore locations (stations) of U.S. coastal waters. Nearshore location GU1019 is located in 10 meters of water directly offshore of Charlotte County, Fla. as shown in FIG. 14.

The average significant wave height, $H_0$, is 0.3 m and the average wave period is 4.0 s. Inserting into equation (2), we obtain a breaking wave height of 0.4 m.

We used the CERC equation for each three-hour interval from WIS Gulf of Mexico Data Hindcast—1976-1995: Station GU1019 (LAT: 27.00 N, LONG: 82.50 W, DEPTH: 10 M) to calculate the annual average alongshore transport. The shoreline orientation was assumed to be oriented along the 150°-330° heading.

Figure 15A:
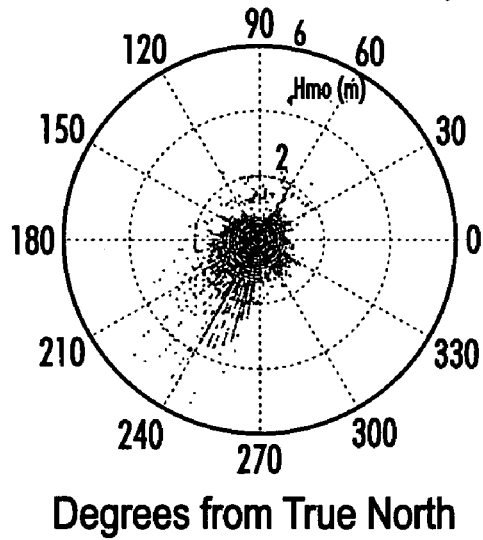
FIGS. 15*a* and 15*b* show, respectively, polar plots of significant wave height and peak wave direction at the exemplar location of FIG. 14.
Figure 15B:
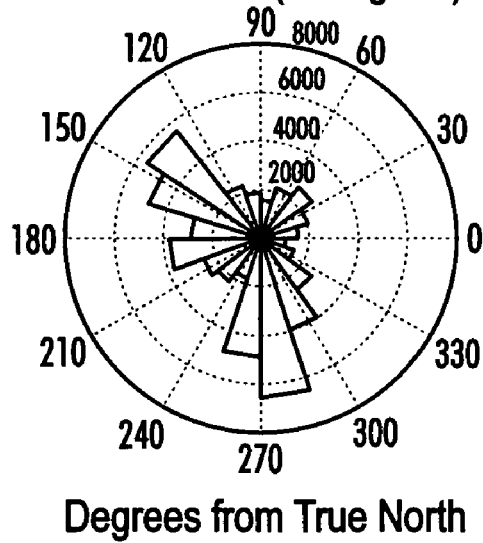

Summary wave statistics showed that the largest waves arrived from approximately 240° (shore-normal), however, most waves were arriving from the 2700-2900 band as depicted in the polar plots of significant wave height and peak wave direction shown in FIGS. 15a and 15b respectively.

For a breaking wave height of 0.4 meters, we calculate the net alongshore transport rate to be 28,087 m³/year to the south if the proportionality constant, K, is 0.2. For K=0.77, we calculate the net alongshore transport rate to be 108,134 m³/year. It is interesting to note that the estimate for when K=0.22, the estimated alongshore sediment transport rate is similar to that calculated for Naples, Fla. which was reported to be on the order of 15,000 to 23,000 m³/yr (POFF, 2003).

Sediment Trapping by Vortices

Figure 16:
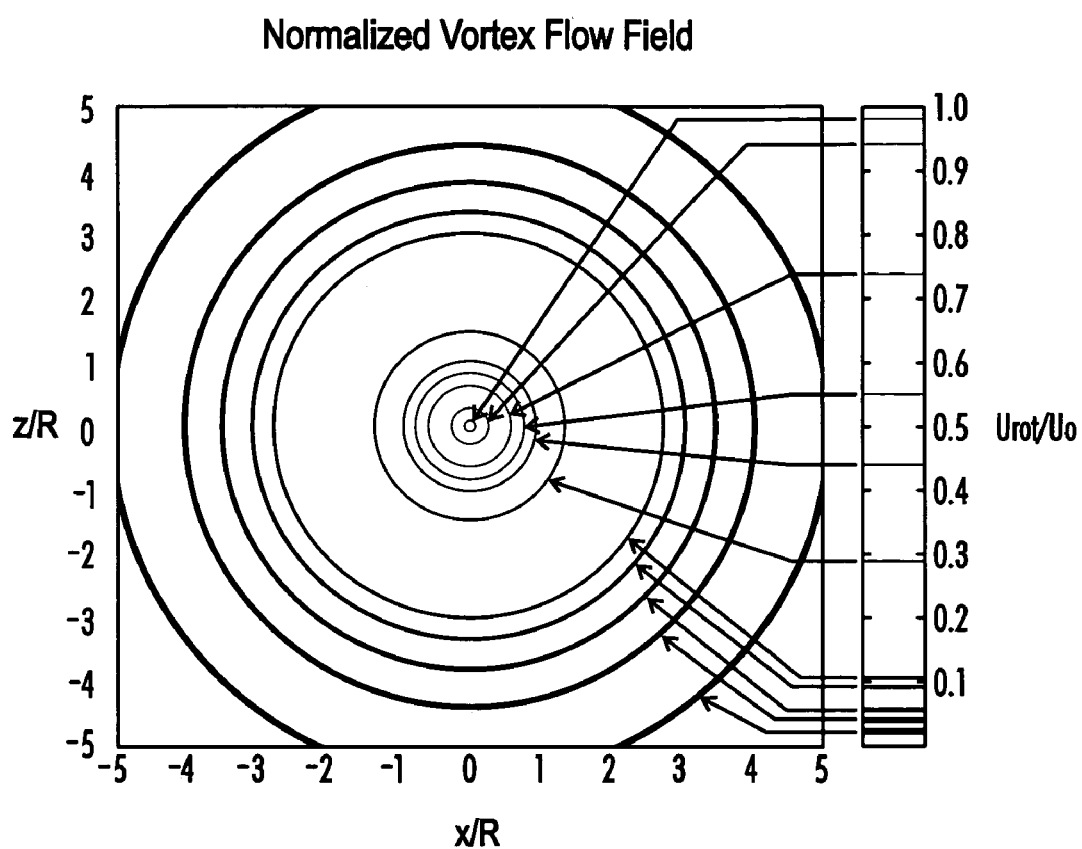
FIG. 16 shows a graph of normalized vortex field flow.

Without being bound by theory, it is reasoned that vortex shedding from the alongshore current over the submerged groin will effectively trap sediments in its lee. In the surf zone, it is known that one of the most important entraining mechanisms for sediments is by vortices with horizontal axes (NIELSEN, 1992). The hydrodynamic mechanism for this occurrence was first illustrated experimentally by TOOBY et al. (1997). The first order solution for the velocity of a sediment particle ($u_s$) as the sum of the fluid velocity (u) and the sediment fall velocity ($w_o$) where:

$$\vec{u}_s(x,z,t) = \vec{u}(x,z,t) + \vec{w}_o \qquad (3)$$

describes the sediment paths in a simple vortex. A natural vortex is modeled using the "Rankine vortex" in which the velocity field is given by:

$$\vec{u}(x,z) = \frac{\omega}{1 + (x/R)^2 + (z/R)^2}\begin{bmatrix} -z \\ x \end{bmatrix} \qquad (4)$$

where R is the radius of the vortex core. The mapped solution shows the angular velocity as a function of non-dimensional distance from the vortex core, which rotates as a solid body as shown in FIG. 16.

Figure 17:
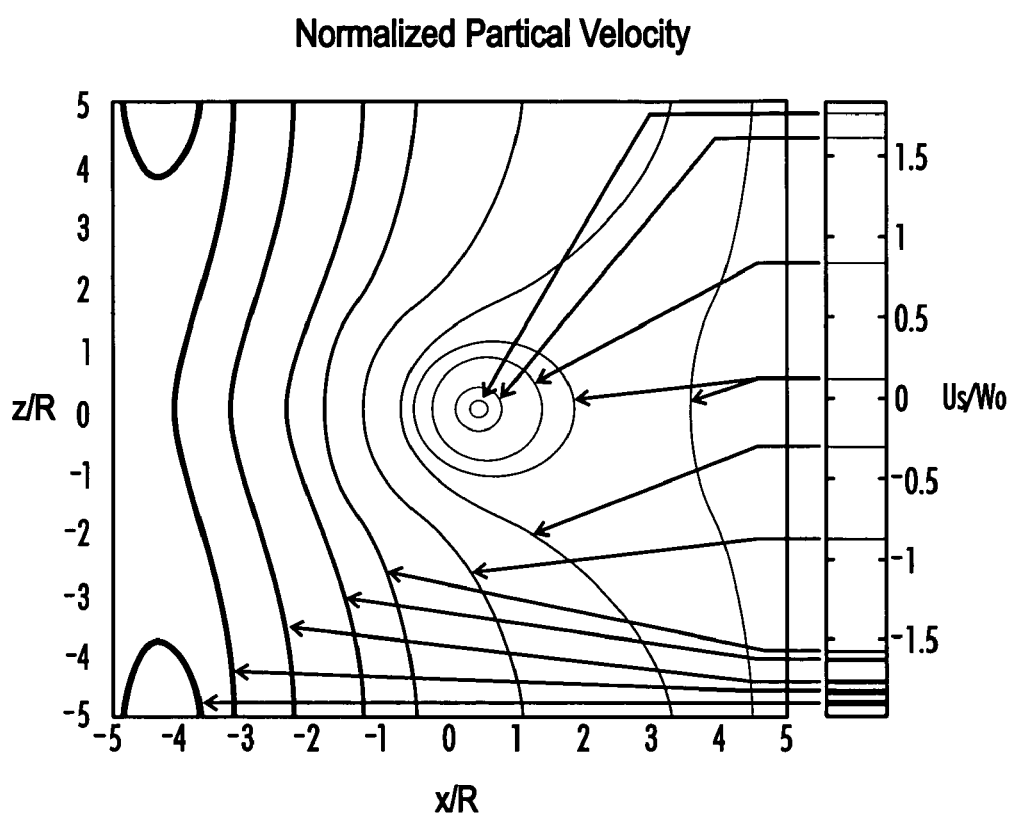
FIG. 17 shows a graph of normalized particle velocity in a vortex field.
Figure 18:
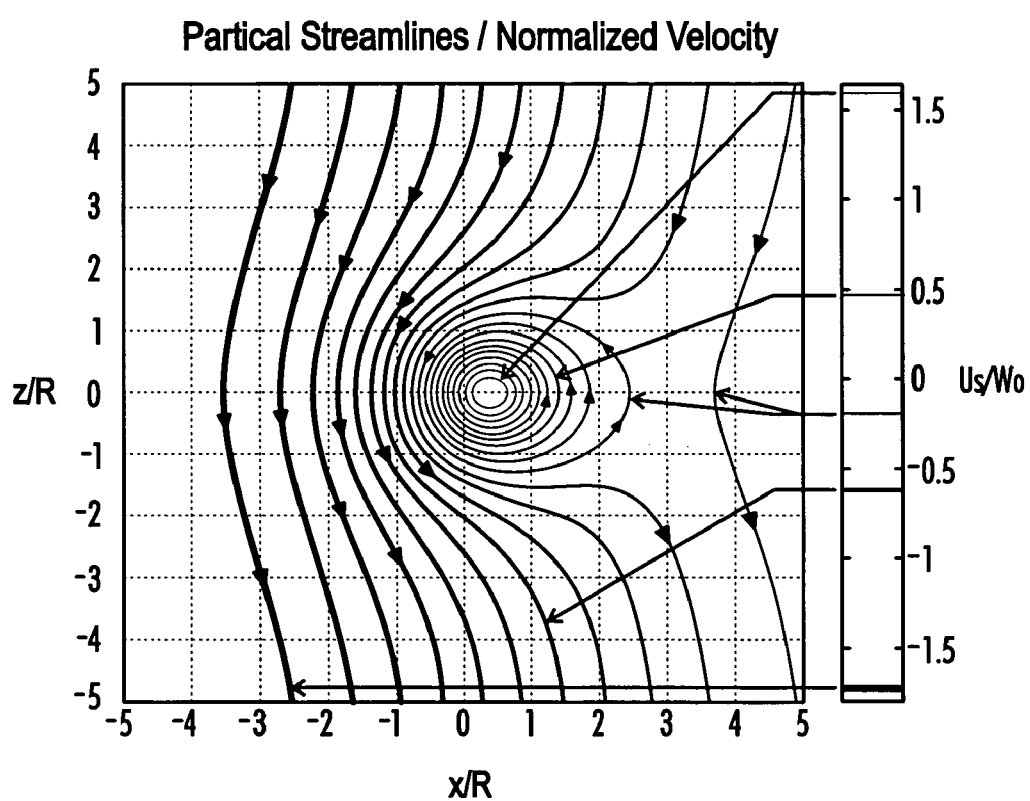
FIG. 18 shows normalized sedimentary particle stream lines in a vortex field.

In this idealized vortex, a sand grain with settling velocity, ($w_o$) can be superimposed to calculate the velocity of a sediment particle ($u_s$) and to illustrate sediment pathlines as shown in FIGS. 17 and 18. Examining the particle velocity field, we see that the upward velocity of a sediment grain within a vortex is greater than its settling velocity in the vicinity of the core body rotation of the vortex. Here, sediment does not settle to the bed, but remains trapped within the vortex. FIG. 17 shows the sediment particle paths are closed in this region and trapping is enhanced. Farther removed from the center of the vortex, we see that in the upward flowing regions of the vortex (the right side), the ratio of $u_s$ to $w_o$ becomes zero, and sediment settles toward the bed with a speed of $w_o$. On the left side of the vortex, sediment settles to the bed with a speed greater than $w_o$ because $u_s$ is negative in this region. FIG. 17 shows that the pathlines of sediments in the vicinity of the vortex better illustrate this event.

Vortex shedding will not only entrain sediments in the lee of a submerged structure, but will also induce turbulence that will extract energy from the flow and reduce the effectiveness of the alongshore current in transporting sediments.

Energy Extraction by Vortices

Energy is extracted from waves crossing a submerged structure by the generation of vortices parameterized as rotational velocity, $u_{rot}$. To calculate the reduction of energy over the "no-structure" case, which is idealized as parallel streamlines of constant velocity, $u_\infty$, which represents the free-stream velocity of the alongshore current, we take an energetics approach, and write:

$$1 - \frac{1}{A}\int\int \frac{u_{rot}^2}{u_\infty^2} dx\,dz \qquad (5)$$

as an estimate of the energy reduction associated with the structure-induced vortex motion where A is the area enclosed around the vortex.

Modeling $u_{rot}$ using equation (4), equation (5) is rewritten as:

$$1 - \frac{1}{A}\frac{\omega^2}{u_\infty^2}\int\int \frac{1}{\left(1+\left(\frac{x}{R}\right)^2+\left(\frac{z}{R}\right)^2\right)^2} dx\,dz \qquad (6)$$

Since $u_{rot}$ is symmetrical about x and z, and accounting for the rapid reduction in the influence of the structure as x/R and z/R approach, equation (6) is rewritten as:

$$1 - \frac{4}{A}\frac{\omega^2}{u_\infty^2}\int_0^5 \frac{1}{\left(1+\left(\frac{x}{R}\right)^2\right)^2} dx \qquad (7)$$

Solving equation (7) to obtain:

$$1 - \frac{4}{A}\frac{\omega^2}{u_\infty^2}\left(\frac{R^2 x}{2(R^2+x^2)} + \frac{1}{2}R\arctan\left(\frac{x}{R}\right)\right) \qquad (8)$$

Next, equation (8) is solved in the region of influence of the vortex where x/R<5, see FIG. 16. For a singular vortex, 4% energy reduction is achieved; however, for a standard vortex street, four vortices may be present in a region bounded by x/R=5 and z/R=5 (see e.g.; Lamb, 1932). Integrating over the entire street yields energy reduction of 16%.

Reduction in Incident Wave Height Due to Energy Extraction by Vorticies

A new incident wave height based upon energy losses is determined through the following the wave energetics equation:

$$E = \frac{\rho g}{8} H^2 \qquad (9)$$

where E is the energy translated into the surf zone by incident waves, $\rho$ is the density of sea water g is gravitational acceleration, and H is the local incident wave height.

The new energy state of the surf zone based upon the energy extraction by vorticies is determined through he following equation:

$$E_{new} = \frac{\rho g}{8} H_{old}^2 \left(1 - \frac{\%_{redux} E}{100}\right) \qquad (10)$$

where $\%_{redux}E$ is the percentage reduction of energy in the surf zone calculated by equation (8).

Finally, based upon incident wave energetics, the new incident wave height is calculated to be:

$$H_{new} = H_{old}\sqrt{(1-\%_{redux}E/100)} \qquad (11)$$

Reduction in Alongshore Current Due to Energy Extraction by Vortices

We can calculate the theoretical alongshore velocity profile using the analytical solution by Longuet-Higgins (1970):

$$V = \begin{cases} B_1 X^{p_1} + AX & 0 < X \leq 1 \\ B_2 X^{p_2} & 1 < X \leq \infty \end{cases} \quad (12)$$

where, $$X = \frac{x}{X_b} \quad (13, 14)$$
$$V = v/v_0$$

are the non-dimensional cross shore distance and alongshore velocity normalized by the surf zone width, $X_b$, and velocity, $v_o$, which is written as:

$$v_0 = (5\pi/16)\gamma\zeta^2(S/C_f)\sqrt{gH_b}\sin(\alpha_a)\cos(\alpha_b) \quad (15)$$

where $\gamma$ is the surf-similarity parameter describing the ratio of the local wave height to the local water depth ($H_x/h_x$), $\zeta$ is the quantity $[1/(1+3\square 2/8)]$, S is the beach slope, $C_f$ is the bottom drag coefficient, $H_b$ is the wave height at breaking, $\alpha_a$ and $\alpha_b$ is the angle of the breaking wave to shore-perpendicular and shore-parallel, respectively.

p is related to P, a cross-shore mixing parameter calculated as:

$$P = (\pi N S / \gamma C_f) \quad (16)$$

where N is the lateral eddy viscosity.

A new breaking wave height is calculated based upon the energy reduction due to vorticies shed from the submerged system:

$$H_{b_{new}} = H_{b_{old}} \sqrt{(1 - \%_{redux} E/100)} \quad (17)$$

Inserting (17) into (15) we find that, $$v_{0_{new}} = v_{0_{old}}(1 - \%_{redux} E/100)^{1/4} \quad (18)$$

and, that $$V_{new} = v/[v_{0_{old}}(1 - \%_{redux} E/100)^{1/4}] \quad (19)$$

where the width of the surf zone, $X_b$ is where $$[H_{b_{old}}\sqrt{1 - \%_{redux} E/100}]/h_{x_b} = 0.78$$

and, therefore the new depth of wave breaking, $h_{x_b}$, is $$h_{x_b} = 1.28 H_{b_{old}} \sqrt{1 - \%_{redux} E/100} \quad (20)$$

and the new width of the surf zone becomes, $$X_{b_{new}} = [1.28 H_{b_{old}} \sqrt{1 - \%_{redux} E/100}]/S \quad (21)$$

which is related to the former surf zone width by, $$X_{b_{new}} = X_{b_{old}} \sqrt{1 - \%_{redux} E/100} \quad (22)$$

We define a new non-dimensional cross shore distance as $$X_{new} = x/[X_{b_{old}} \sqrt{1 - \%_{redux} E/100}] \quad (23)$$

Solving Equations (12) through (16) with LOCAL PRE-CONSTRUCTION DATA, including the incident wave height from the S4 current meter and the ADCP (acoustic Doppler current profiler), we can predict the new alongshore current profile using Equations (19) and (23).

Initiation of Sediment Motion including Energy Losses due to Extraction by Vorticies We use the modified Shields Parameter, $\psi_{cr}$, which is a function of sediment grain diameter as, $$\psi_{cr} = 0.095 S_*^{-2/3} + 0.056[1 - \exp(-S_*^{3/4}/20)] \quad (24)$$

where $$\psi_{cr} = \tau_{cr}/\rho(s-1)gd \quad (25)$$

and $$S_* = d\sqrt{(s-1)gd}/4v \quad (26)$$

The bottom shear stress, $\tau_{cr}$, is related to the quadratic drag law by, $$\tau_{cr} = 1/2 f_w \rho u^2 \quad (27)$$

where the wave friction factor, $f_w$, is typically 0.02-0.03.

When the Shields Parameter, $\psi_{cr}$ exceeds the right-hand-side of Equation (24), sediment in the surf zone will be in motion. Here, we combine Equations (24), (26) and (27) to find the current speed at which sediment in the surf zone will be in motion.

$$u = \sqrt{\frac{2(s-1)gd\left[0.095 S_*^{-\frac{2}{3}} + 0.056\left[1 - \exp\left(-\frac{S_*^{3/4}}{20}\right)\right]\right]}{f_w}} \quad (28)$$

Here, we find the energy extraction necessary by vorticies to calculate a new alongshore velocity using Equations (19) and (23) so that is lesser than the right-hand-side of Equation (28) by adjusting the radius of the vortex core (eq. 8), which is directly proportional to the height of the submerged system.

Alongshore Sediment Flux Assuming 12% Energy Loss

We calculate a new alongshore sediment transport rate by inserting Equation (17) into Equation (1), and we find that, $$Q_{new} = Q_{old}(1 - \%_{redux} E/100)^{5/4} \quad (29)$$

We recalculate the expected alongshore sediment transport rate assuming that 16% of the energy arriving into the surf zone is extracted by turbulent vortices.

Now, for a breaking wave height of 0.4 meters, we calculate the net alongshore transport rate to be 23,939 m³/year to the south if the proportionality constant, K, is 0.2. For K=0.77, we calculate the net alongshore transport rate to be 92,164 m³/year.

Expected Change to Beach Profile

To find the sand volume, we integrate the equilibrium beach profile:

$$h = Ax^{2/3} \tag{30}$$

$$V_1 = B\Delta x_0 + \int_0^{x_c} Ax^{2/3}\,dx - \int_0^{(x_c - \Delta x_0)} Ax^{2/3}\,dx \tag{31}$$

where $A = 0.16\ m^{1/3}$ for sand where the median grain size $(d_{50}) = 0.40$ mm (DEAN and DALRYMPLE, 2001), $x_c$ is the horizontal cross-shore distance from the top of the beach berm to the depth of closure, in this case, the depth of active alongshore transport, $D_c$, B is the berm height, and $\Delta x_0$ is the shoreline advancement.

We calculate the depth of closure, $D_c$, with the equation:

$$D_c = 2.28 H_e - 68.5 (H_e^2 / gT_e^2) \tag{11}$$

where $H_e$ is the "effective" wave height which is that wave height that is only exceeded 12 hours per year, and $T_e$ is the associated period.

We can calculate $H_e$ using the equation $$H_e = \overline{H} + 5.6\sigma_H \tag{32}$$

Equation (11) can be approximated as $$D_c = 1.57 H_e \tag{33}$$

We find $\overline{H}$ and $\sigma_H$ using historical data from WIS Gulf of Mexico Data Station GU1019-1976-1995: Mean wave height, $\overline{H} = 0.3$m and $\sigma_H = 0.3$m. Inserting into equations (12) and (13) we obtain 3.1 meters for $D_c$.

Here we are assuming a 2 meter berm height and a 3.1 m depth of closure. Using equation (10), we find that for a net increase of 4,488 m³/yr of sediment over the 1000m study site (28,081 m³/yr–23,593 m³/yr) yields a 1 meter shoreline advancement and $V_1 = 4.5$ m³/m/yr. For a net increase of 17,302 m³/yr of sediment over the 1000m study site (108,134 m³/yr–90,832 m³/yr) yields a 3.5 meter shoreline advancement and $V_1 = 17$ m³/m/yr.

Thus, although there have been described particular embodiments of the present invention of a new and useful Coastal Erosion Mitigation Solution (CEMS), it is not intended that such references be construed as limitations upon the scope of this invention except as set forth in the following claims.

What is claimed is:

1. A method for calculating the parameters of a groin field for stabilizing a beach, said method including the steps of:
   providing a computer system having
   (a) a database, memory and an input-output device;
   (b) a first software module for storing in the database and displaying beach profile data, significant wave height data, wave direction and period data, and wind speed and direction data, horizontal current data and grain size data;
   (c) a second software module for calculating wave transformation incident wave energy, wave energy dissipation, wave-set-up, wave-set-down, and alongshore currents;
   (d) a third software module for numerically modeling the data of said first and second software modules to provide a beach profile;
   (e) a fourth software module using iterative liner algebraic methods to generate groin field parameters including groin length, groin width, groin height, groin weight, groin spacing and groin aspect angle to the shore;
   employing said computer system to produce an engineering design for placement of one or more sand filled, low profile geotextile tubes in proximity to the beach to produce the groin field; and
   implementing the engineering design to place the one or more sand filled, low profile geotextile tubes in proximity to the beach in accordance with the engineering design to produce the groin field, wherein the incidence angle of the groin field to the shore, the length of the groin field, the width of the groin field, the height of the groin field, the cross-sectional height of the one or more sand filled, low profile geotextile tubes, the width of the one or more of the sand filled, low profile geotextile tubes, and/or the mass of one or more of the sand filled, low profile geotextile tubes are mathematically determined using an iterative series of model excursions in combination with probability analysis such that the groin field interacts with at least a portion of sediment carrying waves of the beach to reduce the velocity of the along shore current of said beach below the sediment carrying velocity of said beach by an amount sufficient to encourage deposition of sediment in proximity to the beach and mitigating erosion of the beach to stabilize the beach.

2. A method of stabilizing a beach comprising the steps of:
   producing an engineering design for placement of one or more sand filled, low profile geotextile tubes in proximity to the beach to produce a groin field; and
   implementing the engineering design to place the one or more sand filled, low profile geotextile tubes in proximity to the beach in accordance with the engineering design to produce the groin field, wherein the incidence angle of the groin field to the shore, the length of the groin field, the width of the groin field, the height of the groin field, the cross-sectional height of the one or more sand filled, low profile geotextile tubes, the width of the one or more of the sand filled, low profile geotextile tubes, and/or the mass of one or more of the sand filled, low profile geotextile tubes are mathematically determined using an iterative series of model excursions in combination with probability analysis such that the groin field interacts with at least a portion of sediment carrying waves of the beach to reduce the velocity of the along shore current of said beach below the sediment carrying velocity of said beach by an amount sufficient to encourage deposition of sediment in proximity to the beach and mitigating erosion of the beach to stabilize the beach.

3. The method of claim 2, wherein one or more of the sand filled, low profile geotextile tubes comprises a porous geotextile tube having a tube width and a tube height.

4. The method of claim 3, wherein the geomorphology characteristics of said beach include beach slope, scarp, bottom characteristics, median grain size (D50/50), and/or beach profile heights determined as latitude, longitude and elevation above the geodetic vertical datum from dunes to a zone of no motion off shore of said beach along multiple profile lines spaced across said beach, and wherein the measurement and analysis of the geomorphology is conducted utilizing a Beach Geomorphology Assessment Module (BGAM), and wherein the BGAM utilizes one or more measured inputs to determine the change in beach slope, determined as a change in height per change in unit time, and the variance of the one or more measured inputs.

5. The method of claim 3, wherein the dynamic forces characteristic of said beach include significant wave height, wave direction, wave period, wind speed, and wind direction, and wherein the measurement and analysis of the dynamic forces characteristic of said beach are conducted utilizing a Beach NOAA Analysis Module (BNAM), wherein the BNAM utilizes NOAA historical data from one or more NOAA databases comprising data from the WAVERIDER buoy system and/or data measured directly at said beach, to determine modal wave height and direction, wind speed and direction, and/or probabilities of wind and wave impacts that can affect said beach.

6. The method of claim 3, wherein the dynamic forces characteristic of said beach include a macro view of the dynamics surrounding said beach suitable to provide a vehicle for multiple excursions, and/or to introduce probabilities useful to gauge the efficacy of data measured directly at said beach, wherein the measurement and analysis of the dynamic forces characteristic of said beach are conducted utilizing a Beach Corps of Engineers Assessment Module (BCAM), wherein the BCAM utilizes data set matrices from the US Army Corps of Engineers public-domain systems to produce a verification matrix suitable for use in the production of the engineering design.

7. The method of claim 3, wherein the production of the engineering design includes a determination of variances of measured data in one or more of:
the vertical profile of horizontal currents at said beach;
local turbidity at said beach;
localized wave heights and periods at said beach;
turbulent velocities at said beach;
local sediment concentrations at said beach; and
sediment flux in the local surf zone of said beach, and wherein the variances are determined utilizing a Beach instrumentation platform Data Assessment Module (BDAM), which determines wave transformations, incident wave energy, wave energy dissipation, and radiation stresses of said beach.

8. The method of claim 7, wherein said BAMM module provides said total impact determination of all wind and wave vectors on said beach in a form suitable for use as a look up table for use in the production of the engineering design.

9. The method of claim 8, wherein the GDAM uses linear algebraic methods to determine the length relation to the height of the sand filled, low profile geotextile tube in an iterative process to a point wherein the near shore current speed is reduced such that at least a portion of the sediment will not be in motion.

10. The method of claim 7, wherein the production of the engineering design includes a Groin Design Assessment Module (GDAM), wherein said GDAM utilizes beach profile characteristics, sediment characteristics, and nearshore characteristics to provide a groin field design comprising groin field length, width, height, weight, spacing, and aspect angle of the one or more sand filled, low profile geotextile tubes, and/or to provide a stability analysis of a groin field design.

11. The method of claim 10, wherein the production of the engineering design includes a Beach Engineering Design Longshore Assessment Module (BEDLAM), wherein the BEDLAM utilizes the groin field design produced by the GDAM and uses an iterative process to re-determine a subsequent groin field design utilizing the BAMM module to evaluate post-storm recovery effects, to produce a final groin field design with respect to a mean high tide, and a mean low tide.

12. The method of claim 3, wherein the production of the engineering design further includes a Beach Assessment Matrix Manipulator (BAMM) module wherein the total impact of all of the measurement and analysis of data from dynamic forces characteristic of said beach and the measurement and analysis of the geomorphology characteristics of said beach are integrated to provide a total impact determination of all wind and wave vectors on said beach.

13. The method of claim 2, wherein the producing of the engineering design includes measurement and analysis of data from dynamic forces characteristic of said beach and measurement and analysis of the geomorphology characteristics of said beach.

14. The method of claim 2 further including the step of post-implementation monitoring of the beach to assess the effectiveness of the implementation of the engineering design, and includes modification of the engineering design to further minimize erosion of the beach.

* * * * *